US011283694B2

United States Patent
Modi et al.

(10) Patent No.: US 11,283,694 B2
(45) Date of Patent: Mar. 22, 2022

(54) SYSTEM AND METHOD PROVIDING USAGE ANALYTICS FOR A MOBILE DEVICE

(71) Applicant: MOVIUS INTERACTIVE CORPORATION, Johns Creek, GA (US)

(72) Inventors: Amit Modi, Fremont, CA (US); Sandeep Kakumanu, Cumming, GA (US); Paul Rubenstein, Roswell, GA (US); Javier Solis Garcia, Madrid (ES); Vasukrishnan Prabhakaran Nair, Duluth, GA (US)

(73) Assignee: Movius Interactive Corportion, Duluth, GA (US)

( * ) Notice: Subject to any disclaimer, the term of this patent is extended or adjusted under 35 U.S.C. 154(b) by 100 days.

(21) Appl. No.: 15/654,700

(22) Filed: Jul. 20, 2017

(65) Prior Publication Data

US 2019/0028368 A1 Jan. 24, 2019

(51) Int. Cl.
| | |
|---|---|
| H04L 12/26 | (2006.01) |
| H04L 43/045 | (2022.01) |
| H04L 12/46 | (2006.01) |
| H04L 41/0816 | (2022.01) |
| H04W 88/02 | (2009.01) |

(52) U.S. Cl.
CPC ........ *H04L 43/045* (2013.01); *H04L 12/4633* (2013.01); *H04L 12/4641* (2013.01); *H04L 41/0816* (2013.01); *H04W 88/02* (2013.01)

(58) Field of Classification Search
CPC ............................. H04L 43/045; H04W 88/02
See application file for complete search history.

(56) References Cited

U.S. PATENT DOCUMENTS

| | | | | |
|---|---|---|---|---|
| 7,130,807 | B1* | 10/2006 | Mikurak | G06Q 10/06 |
| | | | | 705/7.25 |
| 8,068,861 | B1* | 11/2011 | Kupsh | H04W 4/60 |
| | | | | 455/466 |
| 8,121,638 | B2* | 2/2012 | Gisby | H04L 63/102 |
| | | | | 370/329 |
| 8,429,630 | B2* | 4/2013 | Nickolov | H04L 67/1014 |
| | | | | 717/148 |
| 9,306,948 | B2* | 4/2016 | Tse | H04L 63/10 |
| 9,521,117 | B2* | 12/2016 | Barton | H04W 12/08 |
| 9,980,198 | B2* | 5/2018 | Silver | H04W 76/10 |
| 10,581,803 | B1* | 3/2020 | Chang | H04L 63/166 |
| 2004/0081129 | A1* | 4/2004 | Haller | H04L 63/08 |
| | | | | 370/338 |
| 2004/0261116 | A1* | 12/2004 | Mckeown | H04L 12/2801 |
| | | | | 725/109 |
| 2005/0223111 | A1* | 10/2005 | Bhandaru | H04L 12/4604 |
| | | | | 709/236 |

(Continued)

Primary Examiner — Jamaal Henson
(74) Attorney, Agent, or Firm — Smith Tempel Blaha LLC; Gregory Scott Smith

(57) ABSTRACT

A system and method for obtaining usage information for selected applications running on a mobile device. A VPN engine initiates a VPN connection for each selected application when the mobile device is operating in cellular connectivity mode. This results in all data transmitted and received by the mobile device to pass through the VPN connection. A VPN platform can thus identify usage information of the particular application for the particular mobile device.

18 Claims, 14 Drawing Sheets

(56) References Cited

U.S. PATENT DOCUMENTS

| | | | | |
|---|---|---|---|---|
| 2007/0019670 A1* | 1/2007 | Falardeau | H04W 48/18 | 370/465 |
| 2008/0080412 A1* | 4/2008 | Cole | H04L 45/00 | 370/328 |
| 2008/0081606 A1* | 4/2008 | Cole | H04L 12/5692 | 455/424 |
| 2009/0037763 A1* | 2/2009 | Adhya | H04L 12/4641 | 714/4.12 |
| 2009/0276771 A1* | 11/2009 | Nickolov | H04L 67/1014 | 717/177 |
| 2011/0296186 A1* | 12/2011 | Wong | H04L 63/0272 | 713/171 |
| 2012/0002813 A1* | 1/2012 | Wei | H04W 12/068 | 380/270 |
| 2012/0254353 A1* | 10/2012 | Baba | H04L 12/4633 | 709/217 |
| 2012/0317260 A1* | 12/2012 | Husain | G06F 9/452 | 709/223 |
| 2013/0219465 A1* | 8/2013 | Tse | H04L 63/10 | 726/3 |
| 2013/0276094 A1* | 10/2013 | Prat | H04L 63/0245 | 726/15 |
| 2014/0032691 A1* | 1/2014 | Barton | H04L 41/00 | 709/206 |
| 2014/0040979 A1* | 2/2014 | Barton | G06F 21/72 | 726/1 |
| 2014/0096230 A1* | 4/2014 | Wade | H04L 63/0272 | 726/15 |
| 2014/0109174 A1* | 4/2014 | Barton | H04W 12/08 | 726/1 |
| 2014/0226173 A1* | 8/2014 | Tredoux | G06F 3/1238 | 358/1.14 |
| 2014/0341083 A1* | 11/2014 | Shim | H04M 15/68 | 370/259 |
| 2014/0366120 A1* | 12/2014 | Wood | H04L 63/0272 | 726/15 |
| 2015/0109967 A1* | 4/2015 | Hogan | H04W 12/065 | 370/259 |
| 2017/0064749 A1* | 3/2017 | Jain | H04L 63/0263 | |
| 2017/0099159 A1* | 4/2017 | Abraham | H04L 65/102 | |
| 2017/0325113 A1* | 11/2017 | Markopoulou | H04W 4/20 | |
| 2018/0113793 A1* | 4/2018 | Fink | G06F 11/3664 | |

* cited by examiner

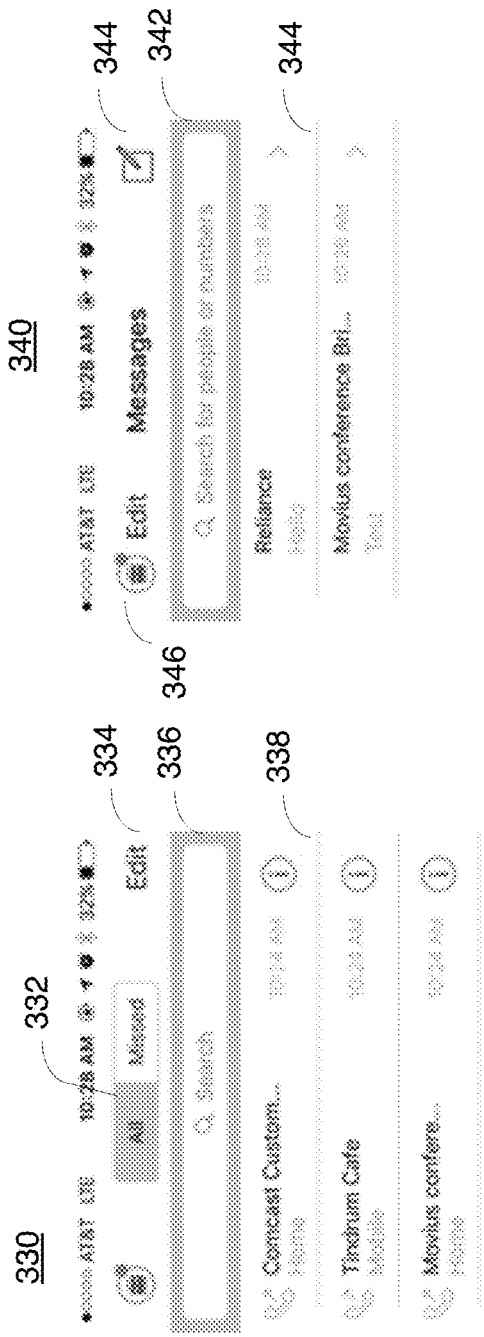
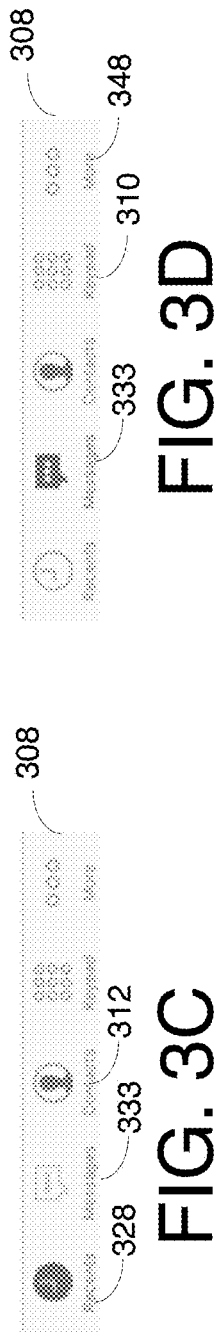
FIG. 3C
FIG. 3D

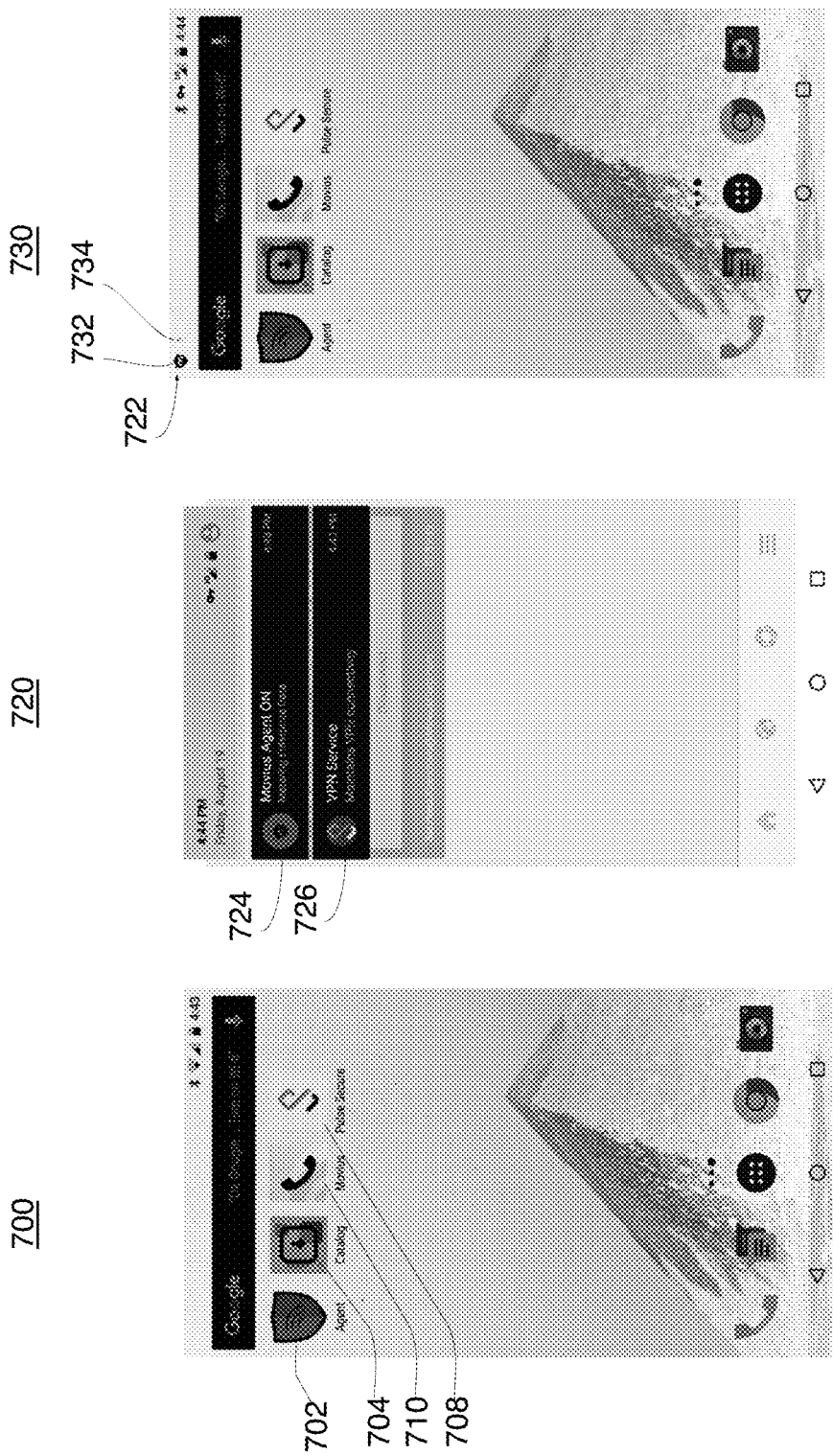

SYSTEM AND METHOD PROVIDING USAGE ANALYTICS FOR A MOBILE DEVICE

CROSS-REFERENCE TO RELATED APPLICATIONS

This application incorporates by reference in their entirety, the following U.S. Patents and Patent Applications:
U.S. Pat. No. 9,332,408
U.S. Pat. No. 9,332,425
U.S. Pat. No. 8,605,870
U.S. Pat. No. 9,332,128
U.S. Pat. No. 9,648,165
U.S. patent application Ser. No. 14/726,596
U.S. patent application Ser. No. 14/727,559
U.S. patent application Ser. No. 14/727,837
U.S. patent application Ser. No. 14/727,864
U.S. patent application Ser. No. 15/081,822
U.S. patent application Ser. No. 15/081,910
U.S. patent application Ser. No. 15/081,916
U.S. patent application Ser. No. 15/470,867

BACKGROUND

The new buzz word in the high-tech business sector is BYOD, which is an acronym for
Bring Your Own Device. What this means is that an employee will use their own device for work activity. Companies are embracing this mode of operation for several reasons, such as cost savings, improved productivity, and improved employee morale. The cost savings are realized in that employers do not have to purchase the equipment for their employees but rather, allow the employees to use devices that they have purchased for their own personal use. The companies can then purchase software enhancements for the employee devices and avoid the expense of purchasing new devices as well as maintaining the devices.

One of the technology arenas that is particularly popular in BYOD settings is the smart phone arena. By allowing an employee to use their own smart phone for work, the employer can simply set up a program to reimburse the employee for the portion of usage that is work related.

The applicant of the present application for patent has developed a second line technology that enables a smart phone to include a second cellular/wifi line. The above-referenced and incorporated applications present various embodiments and aspects of this technology. When a second line service is installed on a smart phone, one of the numbers on the smart phone can be used for personal purposes while the other can be used for business or some other purpose.

Implementing or expanding a formal BYOD program is a critical component of today's enterprise mobile agenda. Forward-looking companies recognize that a more mobile workforce is a business necessity, and the prospect of increased productivity, agility, cost-efficiency, and employee satisfaction is driving a growth in the BYOD market. A second line service empowers employees to work more productively on their preferred device, while saving companies time and money as they mobilize their workforce with BYOD. However, one of the biggest challenges of a BYOD program faced by enterprises is how to fairly compensate employees for the data and communication costs for their use of personal devices for company related activities. According to Forrester (as of the filing of this application), 54 percent of U.S. information workers' pay their entire mobile phone data bill for phones they use for work, while 19 percent say their company pays the bill directly, 7 percent say they are reimbursed and 13 percent receive partial reimbursement.

While an enterprise may pay a fixed stipend on a monthly basis or based on a wild estimate, this strategy may not be reflective of the true usage for work related activities and the enterprise may end up paying hundreds of thousands of dollars. Any solution should make sure the employee privacy is honored in that the employee's personal activity on the device is not tracked. Yet another associated challenge is to make sure that an employee is not able to spoof usage in order to charge an increased reimbursement from the employer.

What is needed in the art is a technique to provide billing and analytics pertaining to the voice, text and data usage of the second line. Advantageously, such a solution would greatly improve an employer's ability to monitor and reimburse business expense usages of a BYOD device. Such technology is useful for both BYOD as well as Choose Your Own Device (CYOD) applications. Further, the technology may also be used in a Company Issued Personally Enabled (COPE) setting as well.

SUMMARY OF THE DISCLOSURE

A method and system are described monitoring, metering, collecting and processing usage information of mobile devices, such as BYODs. The various embodiments presented herein and equivalents thereof are referred to as an analytics system. The operations of the various analytics systems can vary depending on whether the analytics system is operating in conjunction with an iOS based device or an ANDROID based device. However, in general, embodiments of the analytics system operate to collect data usage attributed to certain applications or apps running on a particular target device. A goal of the various embodiments is to allow billing entities, enterprises or individual users the ability to bifurcate data usage between business and personal use, or otherwise separate out and classify different types of data usage.

In a particular embodiment, an analytics system is described within the environment of a BYOD running an multi-line service ("MLS") application and one or more other applications that an enterprise wants to monitor. For instance, in a BYOD scenario, a user may use his or her personal device for business purposes and the enterprise may want to reimburse the user for the business related usage. The MLS application presented herein provides direct information feed into a platform (MLS platform) for tallying the usage associated with the MLS application. Thus, an enterprise and request a user to load the MLS application on their personal device and have the personal device to then include a business related phone number. The disclosed MLS application monitors and meters the cellular minutes consumed as well as any cellular data and this can be used for billing purposes.

However, in some circumstances, an enterprise may also require a user to conduct extensive web searching or utilize other apps that consume data. In various embodiments of the analytics system, this usage is monitored and metered through a VPN connection through a VPN platform. Those skilled in the art will realize that a VPN connection provides a secure and private virtual connection between a device another entity but, this technology is also exploited by the various embodiments to monitor and meter data usage. The VPN platform can then provide the usage data of the monitored apps to the MLS platform, which can consolidate the data to identify the total usage to be attributed to the enterprise.

The analytics system can be composed of a combination of components distributed across a mobile platform and a server platform. The components operate together to collect usage data associated with a mobile device and then provide the data in raw or formatted forms.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIG. 3C is an exemplary screen shot of the recent call history for an MLS app.

FIG. 3D is an exemplary screen shot of the message history for an MLS app.

FIG. 7A illustrates home screen 700, which displays various apps that are installed on the ANDROID based device.

FIG. 7B illustrates a screen shot indicating further notification details of the VPN starter agent and PULSE SECURE client.

FIG. 7C illustrates the home screen 730 indicating in the notification bar 722 that the VPN starter agent is active 732 and the PULSE SECURE app is active 734.

DETAILED DESCRIPTION

Figure 1:
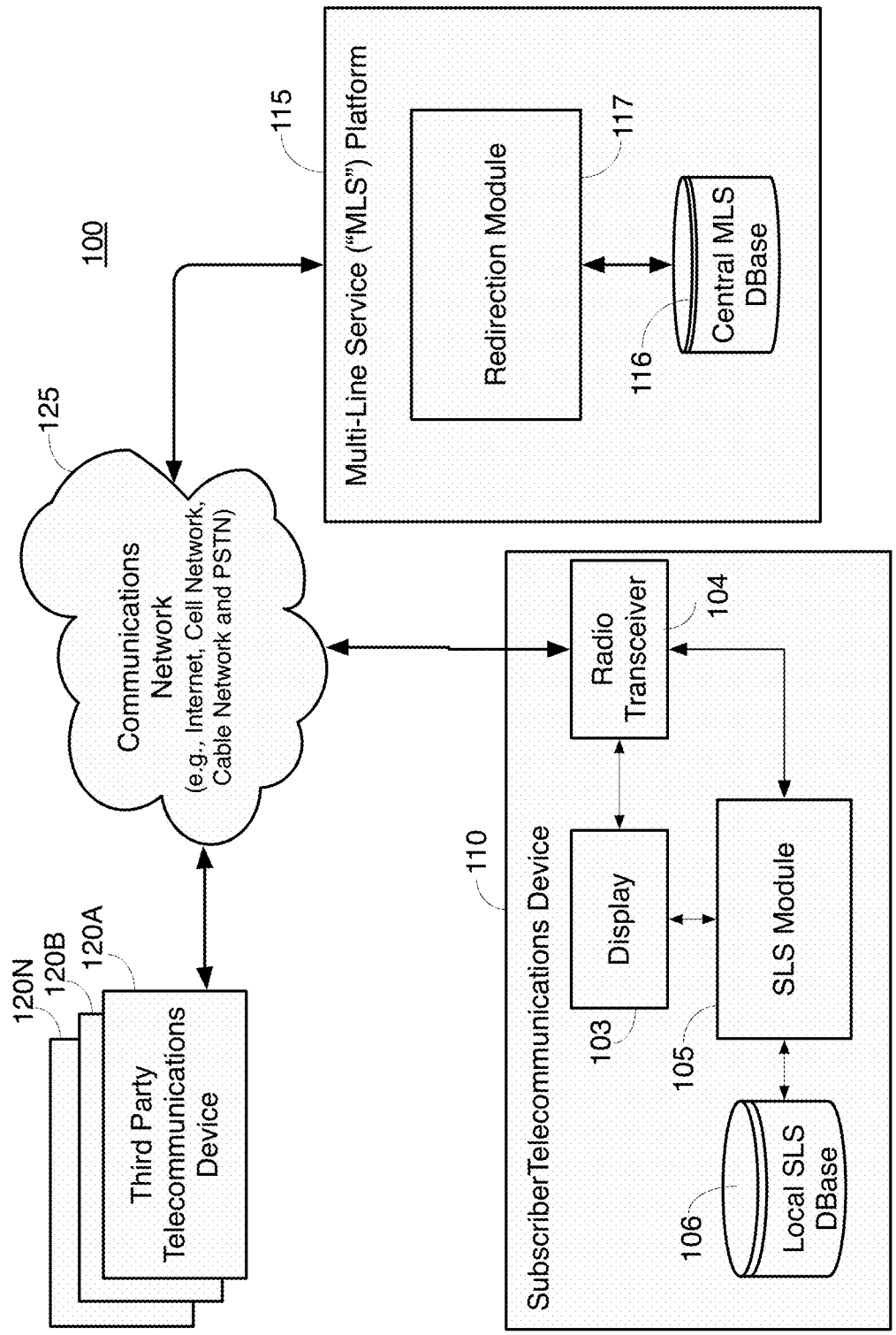
FIG. 1 is a high level diagram illustrating components of an exemplary environment in which the analytics system can operate.

The present invention is directed toward the field of usage monitoring, and more specifically, towards an analytics system that operates to monitor and meter data, minutes and other usage of cellular communications resources and use this information for the provision of other services, such as billing services.

Overview

In various embodiments of the analytics system, a suite of products can be employed to obtain statistics and metering of how much data, minutes or other resources are used by or associated with a second line service running on a mobile platform. For example, suppose employee George works for Acme Phone Company and Acme Phone Company has a BYOD environment. As such, employee George uses his own mobile device for work related operations such as calls, texts and data. The Acme Phone Company in turn wants to reimburse employee George for any and all business related usages of his personal device. In some situations, a company simply provides a stipend, such as $50 as a non-limiting example, to their employees as an estimated amount to cover any business usage of the employee's personal device. In other situations, a company may reimburse the employee based on a percentage of usage, such as 40% of the employee's bill. Yet again, some companies may simply pay the employees entire usage bill in exchange for the employee using their personal device. The various embodiments of the analytics solution presented herein enable a company to reimburse an employee for the exact amount of business usage of the employee's personal device.

Further, advantageously, the various embodiments of the analytics solution presented herein enable employers to not only know how much business usage is made by the employee, but also to correlate the employee's usage with how much they are selling or other performance metrics. For instance, it may be useful for a company to know that if employee George spends X minutes a day in calls to sales leads, that on the average this activity results in obtaining $Z in sales. Further, if employee George spends M minutes a day in calls to leads, this activity on the average results in obtaining $P in sales. This information can help predict employee George's expected performance and to determine the ROI for certain activity.

As such, the various embodiments of the analytics system provide monitoring and metering. Monitoring aspects of the various embodiments operate to determine at what a user is doing, who they are calling, etc. Metering aspects of the various embodiments operate to determine how much data or how many minutes are being consumed by a user.

Embodiments of the analytics system may provide differing levels of analytics. For instance, one embodiment may offer basic analytics while another embodiment may offer advanced analytics. Further, some embodiments may include multiple levels of analytics that are enabled or disabled based on particular criteria, such as credits earned by a user, payments made, etc.

As a non-limiting example, an analytics system may provide basic analytics that are limited to data usage around the communications app, such as a second line service app, including calls, data and texts transmitted/received using the second line service app.

As another example, an analytics system may provide further or advanced analytics. For instance, an embodiment may be deployed for an enterprise that imposes particular operating requirements on it employees. Such requirements may include requiring the employees to utilize a particular app, such as an email app, calendaring app, etc. Thus, the employees of the enterprise are required to install and utilize such apps on their BYOD. Further, the enterprise may desire to reimburse employees for the data usage related to these apps. In the context of reimbursement, current regulations dictate that metering is to occur at a cellular infrastructure location, such as an MTSO, not at an individual client device. The regulation is imposed because the client devices can be hacked and/or spoofed to modify the reported amount of data usage.

Data metering within the cellular system can be accomplished through the use of a Virtual Private Network ("VPN"). In essence, when an application is to be metered, that application is associated or affiliated with a VPN such that any data transmitted or received for the metered application is passed through the VPN to the PSTN.

As a non-limiting example, when an application is launched on a mobile device, the Remote Authentication Dial-In User Service ("RADIUS") protocol can be utilized to meter the data usage. When a metered application is launched, a VPN can be manually or automatically opened and metering can ensue. Thus, the data usage for that particular application can be tracked.

These and other embodiments and features are presented in greater detail in the following text.

Exemplary Environment

The various embodiments of the analytics system solve the challenges associated with data metering in a BYOD environment. Throughout this description, a particular solution for a particular environment is presented for illustrative purposes. However, it should be appreciated that aspects of the present invention can be modified and implemented in different configurations for different environments and the illustrated exemplary embodiments should not be construed as limitations on the invention.

FIG. 1 is a high level diagram illustrating components of an exemplary environment in which the analytics system can operate. Namely, the illustrated environment includes the components of a system for providing a second line service ("SLS") or a multi-line service (MLS) to a user of telecommunications device ("TD").

The system 100 operates to provide a second line service to a user of TD 110. TD 110 is also associated with a primary phone number assigned to it by a primary service provider, as is understood by one of ordinary skill in the art. A subscriber to a multi-line service ("MLS") offered through exemplary system 100 may receive calls at TD 110 that are directed to either of the primary phone number provided by the primary service provider or a secondary phone number ("MLS phone number") provided by the MLS platform 115.

In general, any call directed to either of the primary phone number or an MLS phone number are transmitted from a third party TD 120 (which may or may not be a subscriber to the MLS) to the subscriber TD 110 by way communications network 125. Notably, communications network 125 envisions any and all networks for transmitting and terminating communications between telecommunications devices such as, but not limited to, cellular networks, PSTNs, cable networks and the Internet. Methods for effecting the transmission of data across communications network 125 from one device to another, including call setups, terminations and the like are understood by those of ordinary skill in the art of data transmission.

A call made from a third party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CLID"), i.e. the phone number, associated with third party TD 120 such that when the call is received at subscriber TD 110, the CLID may be displayed for the benefit of the subscriber on display component 103. Notably, although the exemplary embodiments described in the present disclosure use the CLID as an example of data that may displayed for the benefit of the user of a subscriber TD 110, it will be understood that any data associated with the third party TD 120, subscriber TD 110, MLS platform 115 or the like may be rendered for the benefit of the user of the system 100 and, as such, only describing that the CLID is displayed will not limit the scope of what is envisioned by the disclosure. Moreover, it is envisioned that any data uniquely associated with a call to a primary number or an MLS number may be displayed for the benefit of a subscriber to the system 100.

Returning to the FIG. 1 illustration, a call made from a third party TD 120 to an MLS number associated with subscriber TD 110 is transmitted across network 125. The network 125 recognizes where the call needs to be routed based on the called number (the MLS number associated with the subscriber) and routes the call to MLS platform 115. MLS platform 115 thus effectively intercepts the call, determines that the call was intended for subscriber TD 110 and then forwards the call to subscriber TD 110. In this way, while a call directed to a primary number associated with subscriber TD 110 is routed directly to subscriber TD 110, a call directed to a second line number associated with subscriber TD 110 is routed to MLS platform 115 instead. Once received at the MLS platform 115, a query of central MLS database 116 by redirection module 117 may determine that the call from third party TD 120 was meant for the second line number associated with subscriber associated with TD 110. Once the determination is made, redirection module 117 may modify the call data to include data that reflects its identification as a call for the second line number and then forward the call to the primary number associated with subscriber TD 110.

Because the call includes data identifying it as a call to the second line number associated with subscriber TD 110, MLS module 105 may intercept the incoming call, or otherwise be injected into the call processing activity for the call, and then leverage data stored in local MLS database 106 to render it in such a way that the user or subscriber associated with TD 110 knows that the call is for the second line number as opposed to the primary number. The MLS module 105 is designed to work with radio transceiver 104 and any stored or retrievable content in local MLS database 106 to terminate a call to a second line number, render associated data and provide services uniquely associated with the second line number such as, but not limited to, dedicated voicemail, ringtones, caller ID, automated responses, etc.

It should be appreciated that the analytics system can be embodied within an app loaded onto a mobile device, within the platform, such as the MLS platform, or distributed among these and other platforms. Embodiments of the analytics system can be specifically deployed to work in conjunction with the provision of a multi-line service application and a multiline service platform environment, as illustrated in FIG. 1, to provide granular, real-time insights into a user's voice, text, and data usage. The various embodiments of the analytics system can operate on both iOS and Android platforms. The embodiments of the analytics system support collection of data usage by enterprise apps under different models of a BYOD program of an enterprise. An enterprise may already be using an Enterprise Mobility Management (EMM) solution, such as Airwatch, MobileIron, Good etc., to manage applications and devices supported by the enterprise. The various embodiments of the analytics system, such as an embodiment operating in the exemplary environment including the platform powering the MLS app and analytics system, integrates with such EMMs to collect near-real time usage information for apps managed by the enterprise. The MLS platform 115 can also collect usage information in scenarios where an EMM is not in place (for example for small businesses where a full blown EMM is an overkill) as explained later in this specification.

Careful demarcation of usage for work related usage is made and only the portion used for the work related activities is reported. Usage information is reported on both a per-employee basis and an aggregate basis across all users or groups of users. Employers can use the information from the analytics system in a wide variety of ways, including but not limited to:

reimburse the employee for the work related usage based on a fixed rate per minute, message or byte as the case may be
  integrate the usage information with a carrier to directly compensate the employee for the usage, the usage information can be sent directly to carriers using the industry standard Diameter Gy protocol
  gain insights into usage of voice/messaging/data by the employee for work related activities provided as business intelligence reports, such as insights into how much time a sales team spends on calls during a work day Generation of Usage Data The various embodiments of the analytics system offer granular, real-time insights into employees' voice, text, and data usage. This usage data can be reported in a variety of manners. The analytics system can generate a variety of reports including user-friendly graphs and charts, as well as downloadable the usage information such as csv files that can be incorporated or imported or otherwise integrated into other systems.

Figure 2A:
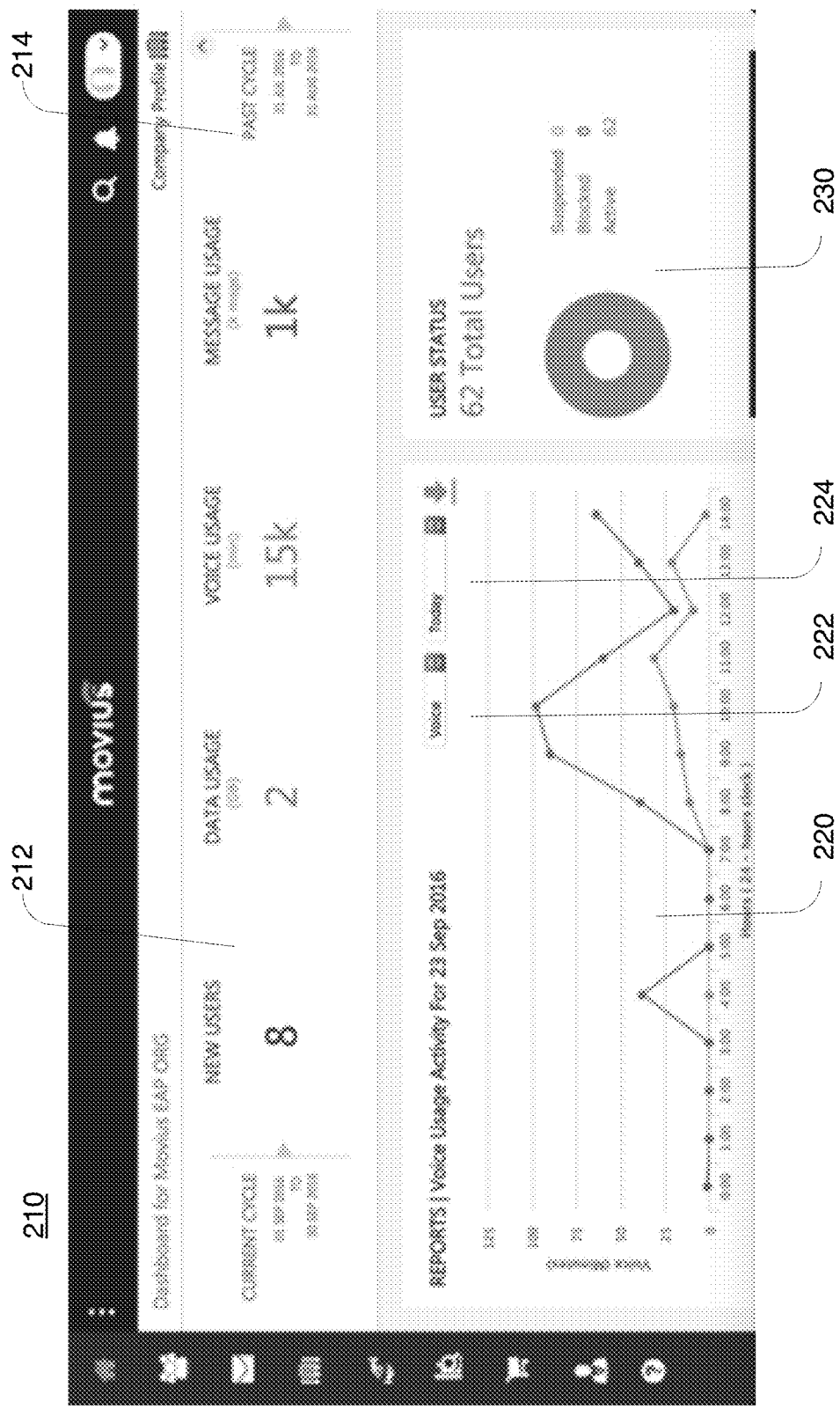
FIG. 2A illustrates a dashboard view of the usage information for a current cycle, Sep. 1, 2016 to Sep. 30, 2016 210.

FIGS. 2A-2D are exemplary screenshots that could be provided from an exemplary embodiment of the analytics system. The usage data in such embodiments can be presented in real time (or near real time) graphs and dashboards and can be customized per day or per billing cycle. Both individual user data and aggregate data can be made available in such embodiments. FIG. 2A illustrates a dashboard view of the usage information for a current cycle, Sep. 1, 2016 to Sep. 30, 2016 210. The top of the dashboard 210 presents a cycle snapshot 212 indicating the number of new users added, as well as the total data usage, voice usage and message usage for the cycle. Further, the snapshot 212 includes a scroll actuator 214 to view previous cycle periods.

A second part of the dashboard includes a daily usage report 220. The data displayed can be selected by a pull down menu 222 and the range or day or type of report can be selected with pull down menu 224. Finally, a user status window 230 is provided to identify the total number of users and their current status (i.e. suspended, blocked or active).

Figure 2B:
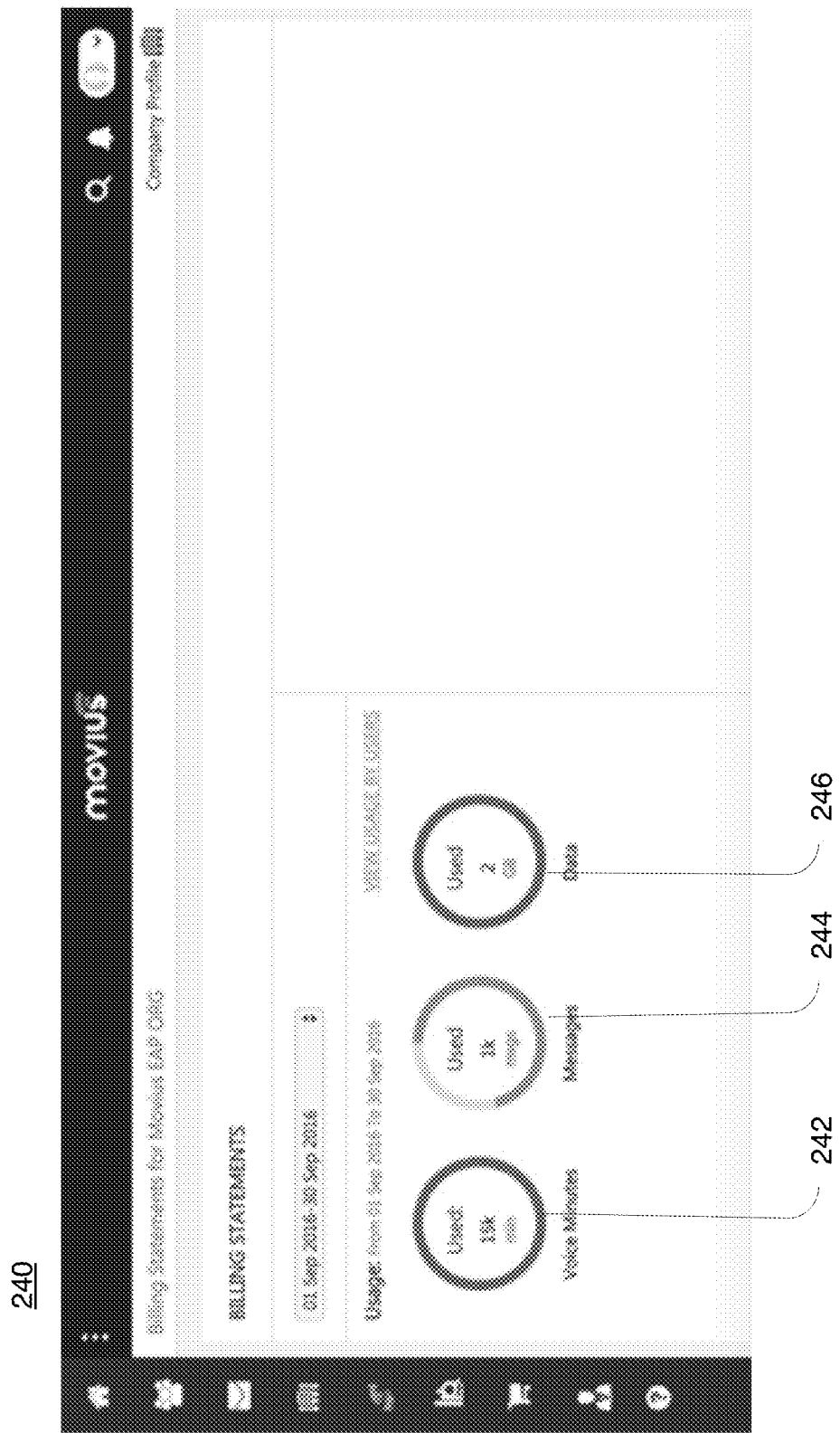
FIG. 2B illustrates a reporting view of a billing statement for a period of Sep. 1, 2016 to Sep. 30, 2016.

FIG. 2B illustrates a reporting view of a billing statement for a period of Sep. 1, 2016 to Sep. 30, 2016. The illustrated screen 240 shows the total minutes used, the total number of messages and the amount of data as a pie chart or percentage illustration of what is allotted for that period. As such, the full number of minutes for the period have been utilized 242, just under 75% of the total allotted messages have been utilized 244 and 100% of the data allotted has been used 246.

Figure 2C:
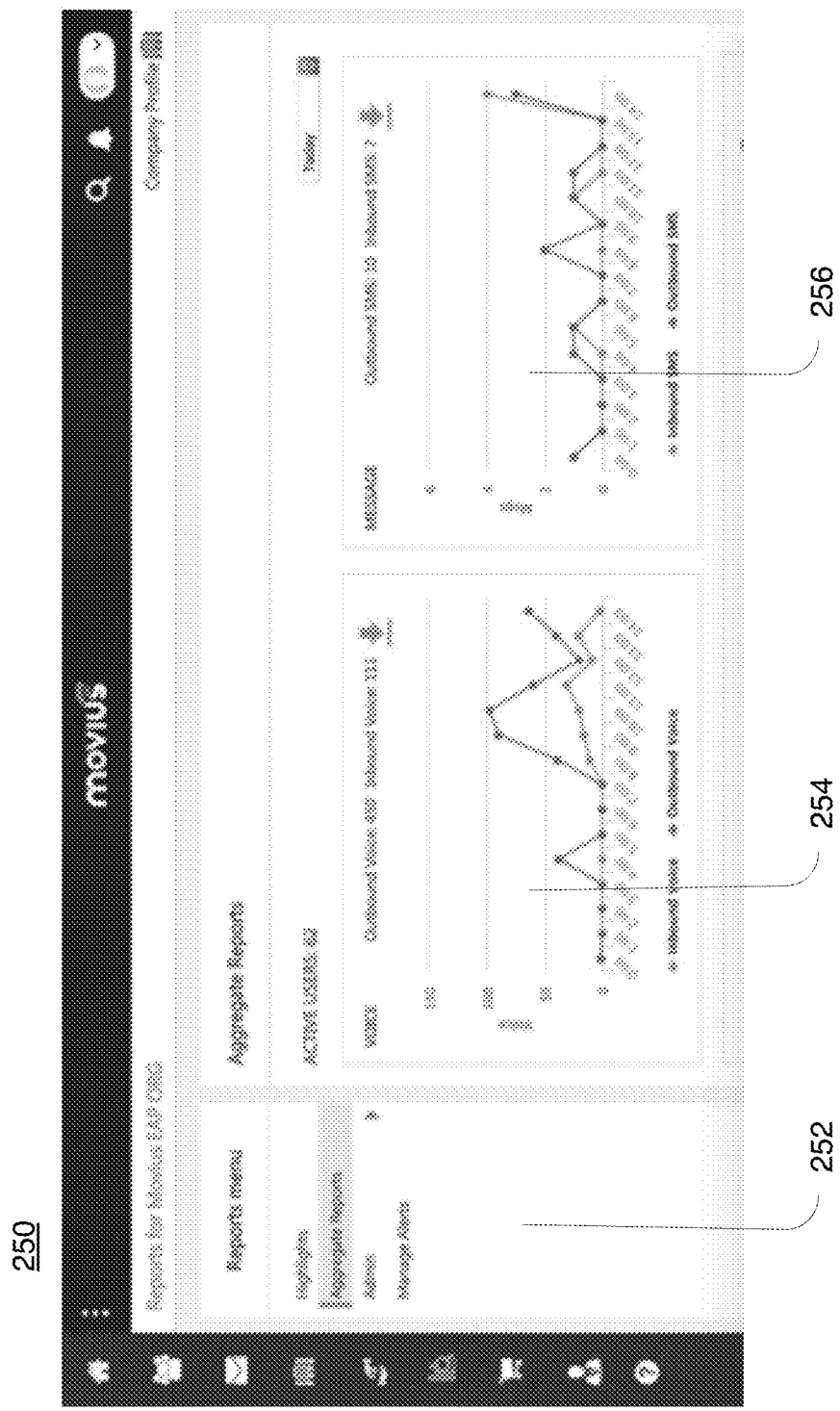
FIG. 2C is a screen shot illustrating exemplary aggregate reports.
Figure 2D:
FIG. 2D is a screen shot illustrating usage information of individual users or subscribers. For instance, of the 62 active subscribers in FIG. 2A, usage data for 6 specific subscribers is illustrated in the user usage chart 260.

FIG. 2C is a screen shot illustrating exemplary aggregate reports. A reports menu 252 enables the selection of different report formats. In the selected Aggregates Reports, the aggregated usage data for the currently active 62 subscribers (see FIG. 2A) is broken down into voice 254 and message 256. The voice usage chart 254 shows the usage data for the selected day as including 450 minutes for outbound voice usage and 111 minutes for inbound voice usage. Further, the message usage chart 256 show the usage data for the selected day as including 10 outbound messages and 7 inbound messages. FIG. 2D is a screen shot illustrating usage information of individual users or subscribers. For instance, of the 62 active subscribers in FIG. 2A, usage data for 6 specific subscribers is illustrated in the user usage chart 260. For example, user Amit Modi is shown having consumed 58 minutes for voice 262, 31 messages 264 and 26 MB of data 266.

The analytics system also generates a near-real time CDR (Call/Charge Detail Record) feed for voice and messaging usage in the MLS app for charging or reconciliation purposes. For data usage, the analytics system keeps track of the mobile data traffic sent and received by enterprise-designated applications. Mobile data usage per application/container is made available both to the carrier for integration with their online charging systems using protocols such as Diameter Gy and to the enterprise using through the analytics system for tracking and control. As an alternative to Diameter Gy, the analytics system may be adapted to use a customized protocol for integration with other online charging systems as well.

Multi-Line Service Embodiment

An embodiment of the analytics system operating within a multi-line service environment include various components that work together in providing the usage metrics for data, voice and messaging. Such an embodiment includes a multi-line application, a multi-line platform, an EMM, a VPN and a management portal.

Multi-line App. The SLS or MLS app makes it easy for enterprises to add multiple company-managed numbers to a corporate or employee-owned mobile phone. The MLS app is an easy-to-use downloadable mobile app (available for both iOS and Android platforms in their respective app stores) that allows employees to make and receive calls and messages on the managed numbers. Using the MLS app, calls can be placed/received using either the TDM minutes available on the mobile device or via a data connection. The internet data connection can be provided by a carrier or by a Wi-Fi connection.

The MLS app allows an enterprise to mobilize its workforce with a BYOD program that's cost effective, easy to manage and compelling to employees. The MLS app separates business and personal use for productivity and privacy. Enterprises can use the MLS app to cut communications expenses by retiring under-utilized desk phones, reducing their investment in mobile devices, and containing service costs, including data overage charges. FIGS. 3A-3D provide screenshots of an exemplary iOS based MLS app.

The near-real time usage metrics of the MLS app, including the minutes used over TDM and data used over the carrier network and Wi-Fi are captured as CDRs at the MLS platform. The analytics system uses these CDRs to display the metrics as part of its offering.

Figures 3A, 3B:
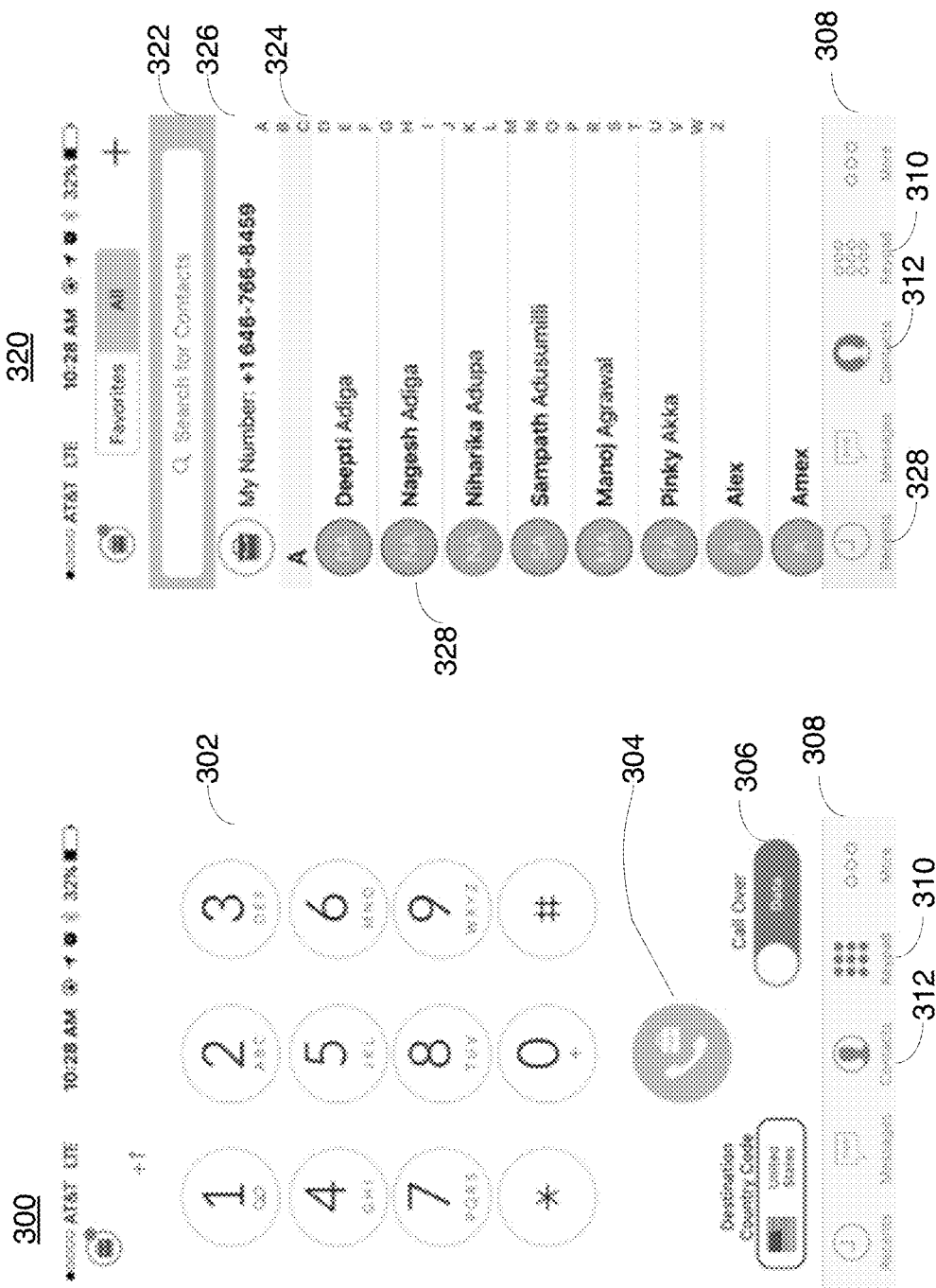
FIG. 3A is an exemplary screen shot of a dialer function of an MLS app.
FIG. 3B is an exemplary screen shot of a contacts or address book function of an MLS app.

FIG. 3A is an exemplary screen shot of a dialer function of an MLS app. The dialer screen 300 includes a key pad 302 and a call button 304. The MLS app also is illustrated as including a media switch 306 to enable a caller to switch between calling over Wifi or data, or calling using cellular minutes. The dialer screen 300 also includes a menu tray 308 at the bottom, which in the illustration indicates that the keypad 310 or dialer is selected. By actuating the contacts icon, the screen transitions to the contacts screen 320 as illustrated in FIG. 3B.

FIG. 3B is an exemplary screen shot of a contacts or address book function of an MLS app. The contacts screen 320 includes a search window 322 to insert search terms, as well as a touch activated index selection 324 to index to a letter within the contacts alphabetical sort. The caller ID 326 associated with the MLS app is displayed above the contacts window, which shows a window into the listing of contacts 328. In the icon tray 308, the contacts icon 312 is shown as being selected. Selecting the recents icon 328 causes the screen to transition to the recent call history screen 330 as illustrated in FIG. 3C.

FIG. 3C is an exemplary screen shot of the recent call history for an MLS app. The recent call history screen 330 includes a switch 332 to select a display of all recent calls or all recent missed calls. An edit function 334 can be selected to edit the recent call list, such as allowing for the deletion of an item from the list among other functions. In addition, the recent call history screen 330 includes a search window 336 to allow search terms to be entered to look for particular recent calls. Finally, a window 338 displays a window into the list of recent calls. Actuating the messages icon 333 in the icon tray 308 results in a transition to the message history screen 340 as illustrated in FIG. 3D.

FIG. 3D is an exemplary screen shot of the message history for an MLS app. The message icon 333 is illustrated as being selected in the message history screen 340. The message history screen 340 includes a search window 342 to search for the names of people or numbers of messages received or sent. In addition, the search window 342 can be used to search for particular content or dates of messages in some embodiments. The message history screen 340 includes a window to show the recent messages either a window of all messages received or a window into the messages that satisfy the search criteria. An edit function 346 is provide to enable various message editing functions such as deleting messages.

Multi-line Platform. The MLS app is just one of several services that can be run on or supported by the MLS platform. Thus, although referred to as the MLS platform in the presented exemplary embodiments, it should be appreciated that the platform is not limited to just supporting the MLS app. An exemplary embodiment of the MLS platform is a next generation, standards-based carrier-grade platform that can be deployed globally and support tens of millions of subscribers. As a global, cloud-based platform, the MLS platform can provide a suite of modular mobile communications services that companies can turn on or off depending on their needs. Platform services integrate easily into an existing communications infrastructure, so enterprises can leverage current assets while adding more functionality and value for users. The MLS platform can provide typical carrier-grade features such as high availability, performance, and network management, statistics, logging, and reporting capabilities. It can be easily integrated into the network, or network functions virtualized (NFV). The highly available solution is also capable of supporting geographical redundancy.

Figure 4:
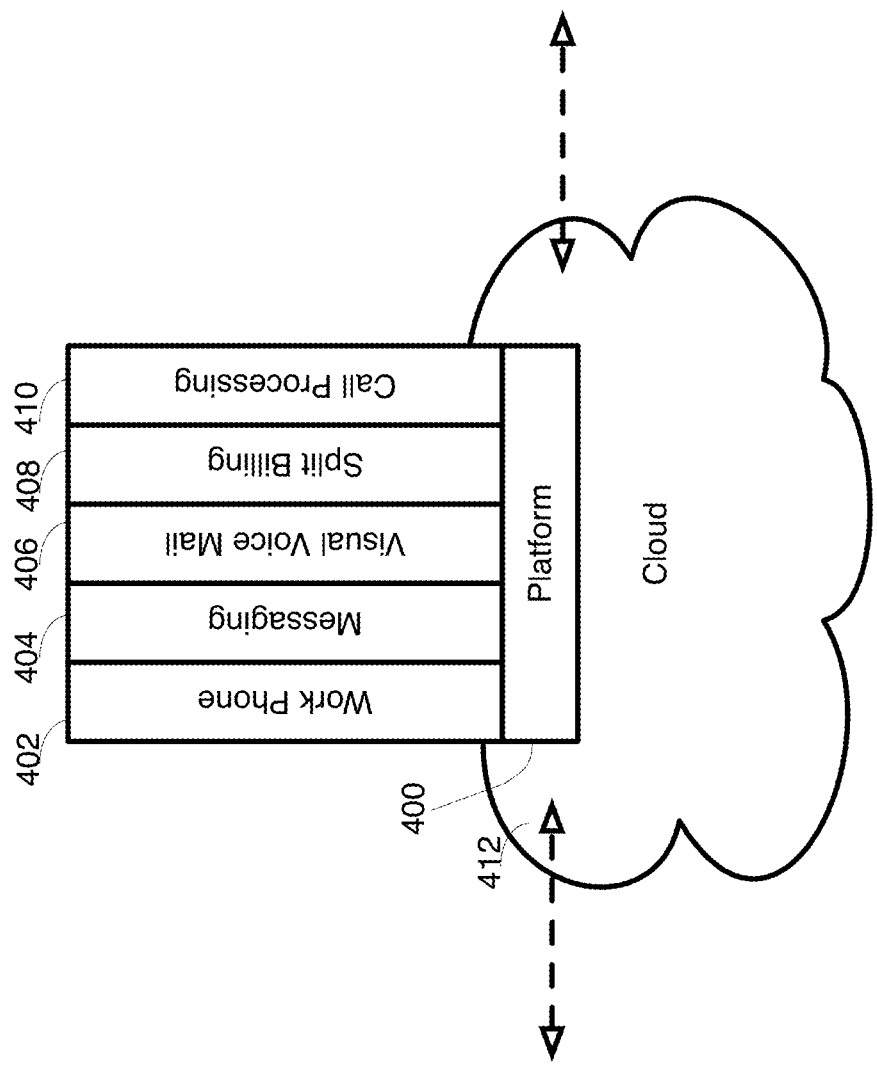
FIG. 4 is a functional diagram of the general platform that can be utilized as the MLS platform in various embodiments.

FIG. 4 is a functional diagram of the general platform that can be utilized as the MLS platform in various embodiments. The platform 400 is illustrated as supporting a work phone 402, messaging 404, visual voice mail 406, split billing 408 and call processing 410 in the illustrated example. The platform enables communication among various supported devices through a cloud 412.

In the provision of the analytics services provided by the analytics system, the MLS platform ideally performs the following functionalities:

Hosts the MLS app.
Directly captures usage metrics of the MLS app.
Captures RAIDUS messages from a VPN server or a data proxy to capture the data usage of the managed applications.
Hosts the portal that displays the usage metrics.
Enterprise Mobility Management (EMM). Some embodiments of the analytics system comes pre-integrated with leading EMM providers. Enterprise mobility management (EMM) is an all-encompassing approach to securing and enabling employee use of smartphones and tablets. In addition to addressing security concerns, a strong EMM strategy also helps employees be more productive by providing them with the tools they need to perform work-related tasks on mobile devices. EMM typically involves some combination of mobile device management (MDM), mobile application management (MAM) and mobile information management (MIM). MDM focuses on locking down mobile devices, while MAM focuses on controlling which users can access which applications and MIM focuses on allowing only approved applications to access corporate data or transmit it. While the three functionalities are distinct, typically a single EMM provider will offer all three. Some of the popular EMMs that the MLS platform can integrate with include Airwatch, MobileIron and GOOD, as a few non-limiting examples.

For embodiments of the analytics system, an EMM is an optional component used to manage the apps that are tracked for data consumption. In such embodiments, the EMM performs the following optional functionalities:

Pushes connection profiles to the managed mobile devices. The profiles configure the apps managed by the EMM in terms of network connectivity via VPN, proxy etc.
Handles the installs of the apps that are managed.
Handles the install of the VPN client on the mobile device.
VPN. Sources of accounting information for data used by managed apps are devices or software components that have the ability to meter traffic usage either because traffic flows through them or because they are at the endpoints of the data flow. The following source of accounting information provides usage information to the aggregation server using a suitable API/protocol:

A tunneling server that terminates data for applications that are using the consumption-tracking feature. This tunneling server may be a VPN server. In some embodiments, the MLS platform may support the Pulse VPN server, although other commercial VPN servers such Cisco AnyConnect, OpenVPN etc. may also be utilized. From a client perspective, iOS supports a per-app VPN approach where the VPN connection to the VPN server is automatically established whenever a managed app is opened. However, on Android such a mechanism does not exist and as such, embodiments provide a background service that monitors app usage to mimic the per-app VPN capability of iOS.

Portal. The portal is the final piece of the analytics system. The portal provides a secure way of accessing the portal for performing a wide variety of tasks including the following:

Manage users on the MLS platform and the phone numbers assigned to the users.

Display work-usage reports to simplify and optimize the employee mobile reimbursement process, giving the enterprise peace of mind for paying employees their fair share of business-related voice, text, and data usage. Reports are also available for download by the EAP admin.

Maintain central security for enterprise mobile usage and gain visibility into how usage is managed and accessed across your entire organization with comprehensive auditing and reporting.

Configure rate plans for individual or groups of users when traveling abroad so that when the user lands outside of their domestic area, they are automatically switched to a new rate-plan reducing the roaming bill.

Exemplary Operation of the Analytics System

Figure 5:
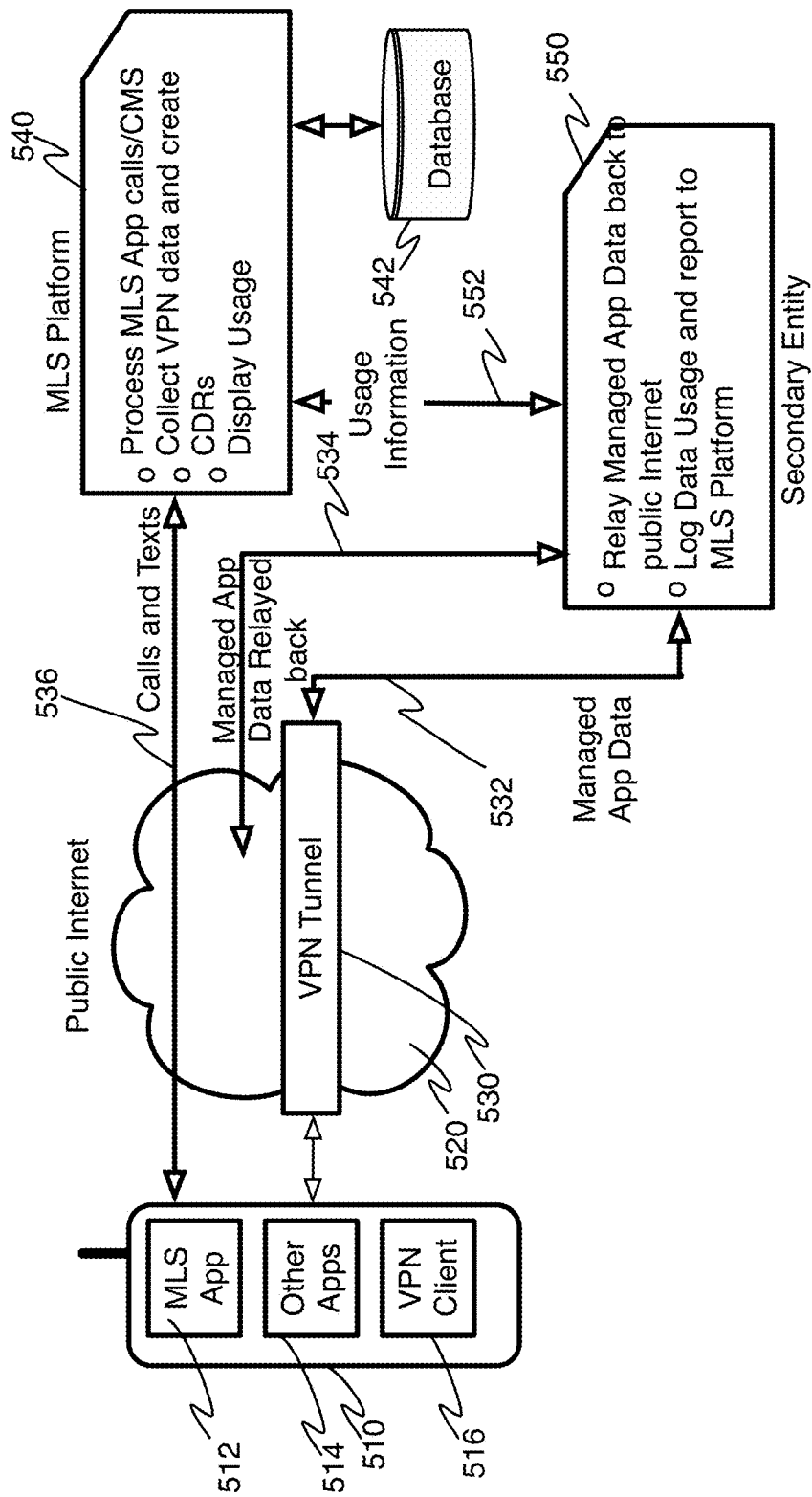
FIG. 5 is a block diagram illustrating an exemplary high-level architecture of the how the usage information can be captured.

The analytics system displays usage information of call minutes, and messaging by the MLS app and data usage by all the apps (including the MLS app) that the enterprise wants to meter in a BYOD scenario. FIG. 5 is a block diagram illustrating an exemplary high-level architecture of the how the usage information can be captured.

The operations of the analytics system in capturing and reporting usage information can be understood by examining the exemplary block diagram of FIG. 5. It should be understood that the analytics system may include components in an MLS app 512 operating on a BYOD 510 and an application operating on an MLS platform 540. Thus, when analytics system is described as taking certain actions, these actions may occur as a result of the MLS app 512 or the application on the MLS platform 540.

An exemplary BYOD 510 may include an MLS app 512 and one or more other apps 514, as well as a VPN client 516. Voice calls and messaging may originate from the BYOD 510 utilizing the MLS app 512. Both the MLS app originated voice and messaging traffic flow through the MLS platform 140 via channel 536, irrespective of whether they are utilizing TDM (cellular minutes) or data. The usage information, namely the voice minutes and number of messages, is directly captured at the MLS platform 540 and provided to a database 542. Further, if data is used for voice and messaging, the total data used by the MLS app 512 is also captured directly at the MLS platform 540.

To meter data usage by other BYOD based applications 514 other than the MLS app 512, the usage information needs to be captured by a different entity other than the BYOD 510. This is a requirement that is imposed by cellular regulatory bodies such as the FCC, CTIA etc. Hence all the data usage from these other applications needs to be directed through a secondary entity, such as a VPN server 550. The analytics system then needs to gain access to this data usage from the secondary entity 550. In some embodiments, to obtain the usage data, the secondary entity 550 can be a VPN server hosted either by the carrier/enterprise or at a cloud operated by the MLS service provider. Movius Interactive is an example of a company that provides the MLS app, platform and cloud services. The MLS platform 540, as part of the analytics system, may support several different types of VPN servers including Pulse Secure, Cisco Anyconnect, Open VPN among various others. To redirect all data of the managed enterprise applications or other applications 514 through the VPN server, the mobile device should have the corresponding VPN client app 516 installed i.e., Pulse Secure client, Cisco Anyconnect client etc. These VPN clients 516 need be configured to direct traffic of only the managed applications 514. Depending on whether an EMM is being used or not the method to configure these VPN clients differs. The configuration methodology is explained in detail below.

All data from a managed app 514 is relayed through a VPN Tunnel 530 existing through the public internet 520 to a VPN server 550. The VPN server 550 can meter the data used on a per-user level. This is possible because each user is assigned a dedicated certificate or username/password credentials for encryption on the VPN tunnel 530. Because all of the data is encrypted on the VPN tunnel 530, the VPN server 550 can only capture aggregated data usage across all the monitored applications 514. Thus, although a primary purpose of the VPN connection is to establish the secure exchange of data, it also enables the ability to identify usage and thus, enable the usage to be monitored and measured to identify the amount of data that a user is consuming. The VPN server 550 can be configured to meter the data usage and create CDRs. These CDRs can be communicated from the VPN server 550 over path 552 to the MLS platform 540 via a variety of manners, such as the RADIUS protocol as a non-limiting example. The RADIUS (Remote Authentication Dial-in User Service) protocol is a network protocol that provides centralized authorization and accounting management for users who connect and use a network service. The RADIUS protocol is broadly supported by network service providers, and as such, embodiments of the analytics system may rely on this protocol for communication of CDRs between the VPN server 550 and the MLS platform 540.

All the analytics data captured is stored in a high-availability database 542 maintained by the MLS platform 540. Thus, the usage information from the MLS app 512 and the usage data obtained from the second entity 550 can all be stored in database 542 and consolidated for reporting, billing, etc. The analytics system makes on-demand queries to the database 542 to gather information necessary for the display of charts and dashboards on the portal, as well as for other applications. As a non-limiting example, the MLS platform 540 may create CDRs that can be integrated into carriers or enterprise billing solutions. Further, the MLS platform 540 can also utilize the Diameter Gy Protocol to send billing information for integration with a carrier's Online Charging System (OCS). When integrating with a carrier's OCS, the MLS platform 540 requires that the traffic from the actual identity associated with the mobile device's SIM card to the set of IP addresses be zero-rated. The MLS platform 540 then opens a charging session for additional identity enabled from the analytics system. The traffic is initially received by the MLS platform 540. Subsequently, when the MLS platform 540 processes and confirms the accounting information for enterprise mobile data, this traffic will be delivered and charged to the enterprise identity.

While the VPN server 550 needs to be configured by the MLS service provide or an enterprise administrator directly, the VPN clients 516 can be configured in two different ways depending on whether an EMM is used to manage the enterprise related apps 514 or if an EMM is not being used. Further, there are variations depending on whether the mobile device is iOS or Android based.

If an EMM, such as Airwatch, MobileIron, Good, Samsung Knox etc., is used by the enterprise or carrier for the managed apps 514, the VPN client 516 on the BYOD 510 can be configured from the EMM. A VPN client 516 will need several pieces of information for configuration, also known as a VPN profile, including: the URL of the VPN server 550, the type of VPN connection (IPSec, L2TP, http etc), username/password credentials or security certificate, and a whitelist of apps whose data traffic needs to be tunneled. The use of the whitelist differs between iOS and Android based devices. Further, there is a difference between iOS and Android based devices if a VPN is established when using a Wi-Fi or cellular for data connectivity.

It should be understood that the various EMMs that are available do not operate to launch VPN connections. Because some embodiments of the analytics system require a VPN connection to receive the required usage information, a mechanism to launch VPN connections for the monitored apps 514 is necessary. In the case of iOS based devices, the VPN connections are automatically established for white listed or monitored apps 514. However, for ANDROID based devices, the VPN connection must be established by other means. In various embodiments, the process monitors activity on the BYOD and establishes VPN connectivity based on network status changes. In some embodiments, the VPN connectivity can be established based on the network status (i.e. cellular or WiFi) and the status of the monitored apps 514 (i.e. running, active, loaded).

iOS supports a special automatic VPN feature known as the Per-App VPN. This feature can be configured only from an EMM. The Per-App VPN feature allows the EMM to provide the whitelist of apps that can use the configured VPN connection. Further, the VPN can be configured automatically start whenever a managed app 514 is opened. The VPN connection will be disconnected after a timeout if no managed app 512 is being used. The VPN connection itself will be used only for the managed apps 512 in the whitelist. The other apps will not use the VPN.

Figures 6A, 6B, 6C:
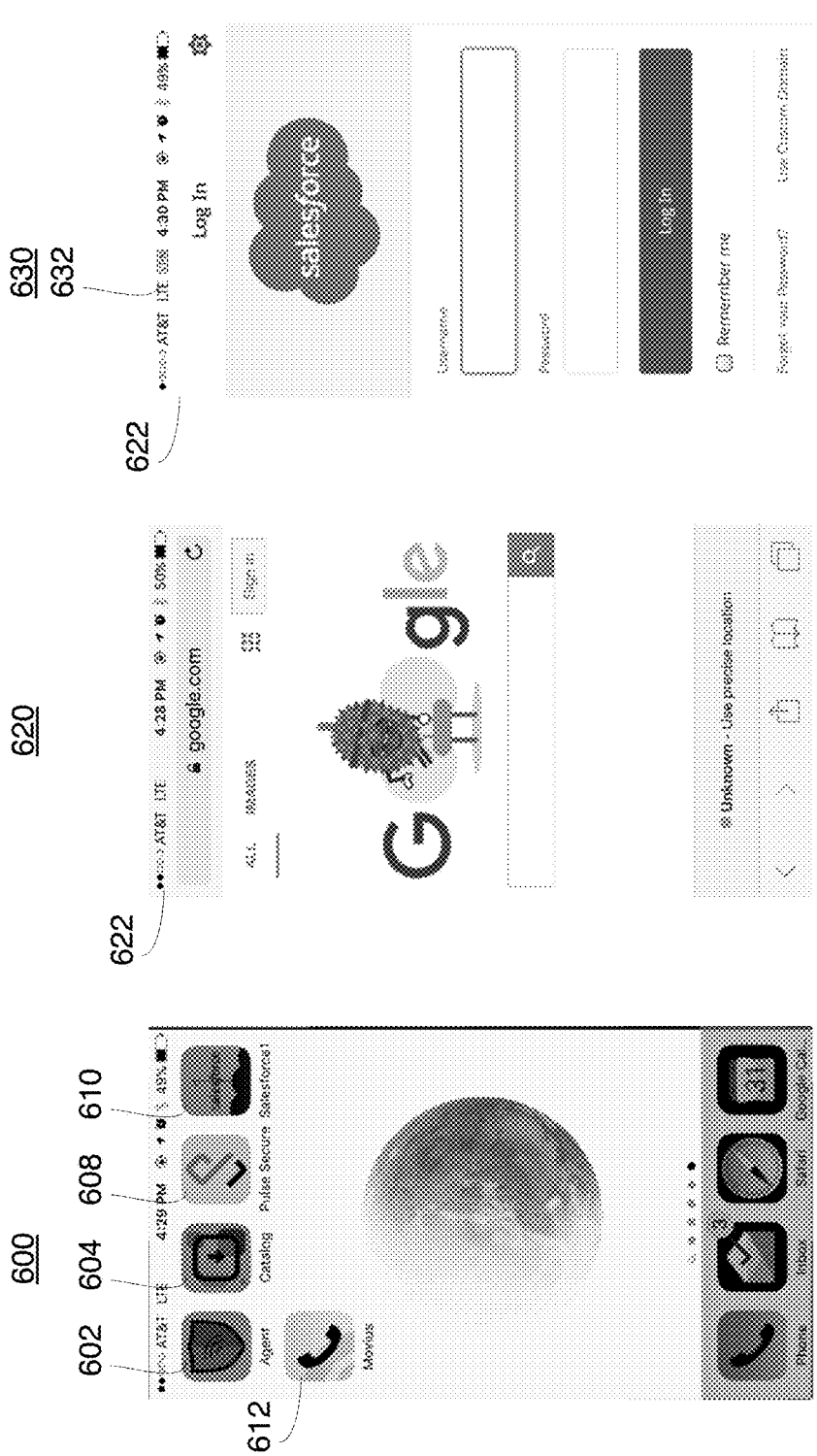
FIG. 6A illustrates the home screen 600 of the iOS device is presented and showing the presence of the various apps including AIRWATCH agent 602, AIRWATCH catalog 604, PULSE SECURE VPN client 608, SALESFORCE 610 and the MLS App 612 with the label MOVIUS.
FIG. 6B illustrates a second screenshot 620, which shows the SAFARI App running on the iOS device.
FIG. 6C illustrates a third screenshot 630, which shows the SALESFORCE app 610 running on the iOS device. Examination of the notification bar 622 shows that the VPN is established as indicated with the VPN status tag 632.

FIG. 6A-FIG. 6C show a series of screenshots illustrating the steps of configuring a VPN client 516 on the BYOD 510. The illustrated steps depict a Per-App VPN in action on an iOS based device. In the illustrated embodiment, the iOS device utilizes AIRWATCH as the EMM and PULSE SECURE as the VPN client 516. The managed app 514 is SALESFORCE. FIG. 6A illustrates the home screen 600 of the iOS device is presented and showing the presence of the various apps including AIRWATCH agent 602, AIRWATCH catalog 604, PULSE SECURE VPN client 608, SALESFORCE 610 and the MLS App 612 identified by the label MOVIUS.

FIG. 6B illustrates a second screenshot 620, which shows the SAFARI App running on the iOS device. The SAFARI app is not managed in the Per-App VPN profile. This can be verified by examining the notification bar 622 of the iOS device. In the notification bar 622, it can be observed that a VPN connection has not established when the SAFARI app is being used.

FIG. 6C illustrates a third screenshot 630, which shows the SALESFORCE app 610 running on the iOS device. Examination of the notification bar 622 shows that the VPN is established as indicated with the VPN status tag 632. SALESFORCE 610 has been configured, such as with the VPN client or EMM, to be included in whitelist of apps that are managed by the VPN. Thus, when SALESFORCE 610 is being used on the iOS, because it is a managed app, the VPN tunnel 530 is established. On an iOS device, the VPN is established irrespective of whether Wi-Fi or cellular is used for data connectivity. However, the VPN server 540 can identify which interface is currently being used and analytics system captures whether the corresponding portion of data needs to be billed (cellular) or not (WiFi).

Similar to the iOS based devices, ANDROID based devices also support a whitelist of apps that can utilize a VPN connection. The ANDROID based devices can utilize an EMM to create a whitelist. However, ANDROID based devices do not support the automatic start of the VPN when a managed application is being used. The VPN connection itself will be used only by the managed Apps, but the user typically must manually start the VPN connection. This is not an elegant user experience as the user must be cognitive of the fact that the VPN connection must be started. Thus, the various embodiments of the analytics system may utilize a VPN starter agent to overcome this issue. The agent can automatically connect/disconnect the VPN connection based on a predetermined set of rules.

FIG. 7A-FIG. 7C present screenshots to illustrate the operation of the VPN starter agent operating on an ANDROID based device. FIG. 7A illustrates home screen 700, which displays various apps that are installed on the ANDROID based device. In the illustrated exemplary embodiments, the EMM running on the ANDROID device is AIRWATCH, PULSE SECURE is the VPN client 516 and SALESFORCE is an exemplary managed app 512. As such, the home screen 700 includes icons for the AIRWATCH agent 702, the AIRWATCH catalog 704 and the PULSE SECURE VPN client 708. The MLS app 710 labeled MOVIUS and the VPN starter agent are also installed on the device. In some embodiments, the VPN starter agent may be a separate app that is manually started or automatically started on powering the device. In other embodiments the VPN starter agent can be embedded within the MLS app 710 and start up whenever the MLS app 710 is active and/or loaded.

Because ANDROID based devices do not support automatic starting of the VPN, the VPN starter agent handles the starting and stopping of the VPN connection. Further, because it is not necessary to meter data usage that occurs on a Wi-Fi interface, embodiments of the VPN starter agent may turn the VPN connection on only when the device is using cellular for the active data connectivity. When the ANDROID based device switches to a Wi-Fi connection, the VPN connection is automatically stopped. The VPN starter agent continuously monitors the ANDROID based device to identify what the active network interface is at all times. One difference from iOS is that the VPN in the ANDROID based devices will always be connected as long as the device is utilizing cellular data connectivity. Although the VPN connection itself is used only for the whitelisted apps, the VPN itself remains connected at all times the device is on cellular.

The VPN starter agent can provide a notification or status indicator to indicate when the ANDROID based device is on a cellular connection. FIG. 7C illustrates a home screen 730 with the VPN starter agent status indicator 732 in the notification bar 722. In some embodiments, notification icon 732 can utilize different colors to indicate whether a VPN connection is established or not. As a non-limiting example, the status indicator can be a solid black icon when the VPN is established or a greyed out icon when the VPN is not established. When the ANDROID based device is on Wi-Fi, the VPN starter agent notification icon may not be displayed at all in some embodiments, or may be a different color in other embodiments. In addition to the notification icon 732 on the notification bar 722, the VPN starter agent may also display helpful text about the status of the VPN connection when the notification bar is swiped down to show notification details.

FIG. 7B illustrates a screen shot indicating further notification details of the VPN starter agent and PULSE SECURE client. The screen 720 is displayed when a user swipes down from the top of the screen, such as from the notification bar 722. In screen 720, additional status pertaining to the VPN start agent is presented with the label MOVIUS AGENT ON 724 and indicating that metering of enterprise data is active. Further, the PULSE SECURE client 708 status 726 on screen 720 is labeled VPN Service and displays the PULSE SECURE icon. The PULSE SECURE status 726 indicates that it maintains VPN connectively.

FIG. 7C illustrates the home screen 730 indicating in the notification bar 722 that the VPN starter agent is active 732 and the PULSE SECURE app is active 734. In the illustrated embodiment, the VPN starter agent is black indicating that the PULSE SECURE app data is being routed through a VPN connection 530.

When an enterprise does not use an EMM to manage the apps on BYOD devices, the VPN starter agent can take on the additional responsibilities. For instance, in some embodiments the VPN starter agent can operate to check whether all the required components for the analytics system to function correctly are installed on the device. This can include verifying the presence of the MLS app 512, the VPN client app 516 (such as Pulse Secure), and all the managed apps 514. If one or more of the apps are not installed on the device, the VPN agent can present a prompt to the user indicating the corresponding app is not installed and will direct the user to the correct page on the GOOGLE PLAYSTORE (or a different app store as required) for downloading and installing the app.

Once the MLS app 512 is installed on the BYOD, the user needs to on-board the app. Briefly, the on-boarding process ensures that the MLS app 512 is configured with the correct MLS platform 540 instance and that the assigned multiline numbers are assigned to the MLS app 512. The VPN starter agent can check whether the MLS app 512 is on-boarded correctly and retrieves the on-boarding information from the MLS app. If the LS app has not been on-boarded, or has not been properly or completely on-boarded, the VPN agent can display a helpful message prompting the user to complete the process and/or presenting instructions on what steps were omitted or not performed properly. This on-boarding information is used by the VPN starter agent to connect to the MLS platform 540 using an archive development kit (ADK) interface and retrieve the VPN profile information. The ADK interface provides a set of APIs for the MLS platform 540 that can be used for configurations. The VPN profile contains VPN configurations including the URL of the VPN server, the type of VPN, automatically configured username/password VPN credentials for the user and the whitelist of managed apps 514 that need to use the VPN.

Once the VPN profile is retrieved, another responsibility is that the VPN starter agent can proceed to configure the VPN client 516 on the ANDROID based device. The VPN client configuration is performed by directly utilizing the VPN client provided APIs.

Once the VPN client 516 is configured with the VPN profile, the VPN starter agent can then handle the connect/disconnect of the VPN client 516 exactly as described in the scenario in which an EMM is utilized.

Thus, it should be appreciated that a VPN starter agent or engine can be loaded onto a mobile device. The VPN engine can include an interface to a mobile device, wherein the operational state of the mobile device can be determined. Further, the VPN starter engine may include a configuration record that contains sufficient information to identify one or more applications to monitor (selected applications) that are loaded on the mobile device. The VPN starter engine also includes a VPN connection controller that is configured to initiate a dedicated VPN connection to an entity. The VPN connection controller an initiate a dedicated VPN connection for each selected application. Further, the VPN connection controller initiates the dedicated VPN connection in response to determining that the mobile device is in the operational state of cellular connectivity. Thus, each dedicated VPN connection is associated with a particular selected application. The VPN start engine is also configured to disable the dedicated VPN connections to the entity in response to determining that the mobile device is not in the operational state of cellular connectivity. As such, in operation, any data usage of any particular selected application occurring while the mobile device is in the operational state of mobile connectivity is transmitted over the dedicated VPN connection for that particular selected application to the entity.

In some embodiments, the interface to the mobile device of the VPN starter engine can be further configured to identify when a particular selected application is active and, the VPN connection controller performs the action to initiate a dedicated VPN connection for that particular selected application proximate to the time that the particular selected application becomes active. Thus, the dedicated VPN connection is only established when the mobile device is in cellular connectivity state and after the particular selected application becomes active in such embodiments.

In other embodiments, the interface to the mobile device of the VPN starter engine can be further configured to identify when a particular selected application is active and, the VPN connection controller performs the action to initiate a dedicated VPN connection only for that particular selected application when the particular selected application is active. Thus, the dedicated VPN connection is only active when the mobile device is in cellular connectivity state and while the particular selected application is active.

Similarly, in other embodiments, the interface to the mobile device of the VPN starter engine can be further configured to identify when a particular selected application is inactive and, the VPN connection controller performs the action to disable the dedicated VPN connection for the particular selected application proximate to the time that the particular selected application becomes inactive.

And even further, in other embodiments, the interface to the mobile device of the VPN starter engine can be further configured to identify when a particular selected application is inactive and, the VPN connection controller performs the action to disable the dedicated VPN connection for the particular selected application only when the selected application is inactive.

It should be appreciated that the VPN starter engine can be a stand-alone app loaded onto and operating on a mobile device, integrated with one or more other apps loaded onto and operating on a mobile device loaded onto the mobile device or be an external function that interfaces to the mobile device.

In addition, an analytic system may incorporate any of the embodiments of the VPN starter engine. The analytics system includes a mobile device onto which the VPN engine is loaded. The analytics system also includes an entity that interfaces to the mobile device over the dedicated VPN connections. Further, a reporter operating on the entity is configured to receive the data usage of each of the selected applications running on the mobile device. In some embodiments, an multi-line system (MLS) platform and an MLS app may be included. The MLS app is loaded on the mobile device and any data usage by the MLS app runs through the MLS platform and thus, the MLS platform obtains the usage information of the MLS app. Further, the MLS platform may interface to the entity to receive usage data associated with the selected applications of the mobile device. In such embodiments the MLS platform can be configured to aggregate the usage data of the MLS app and the usage data associated with the selected applications to create a usage report identifying all usage of the MLS app and the selected applications.

Figure 8:
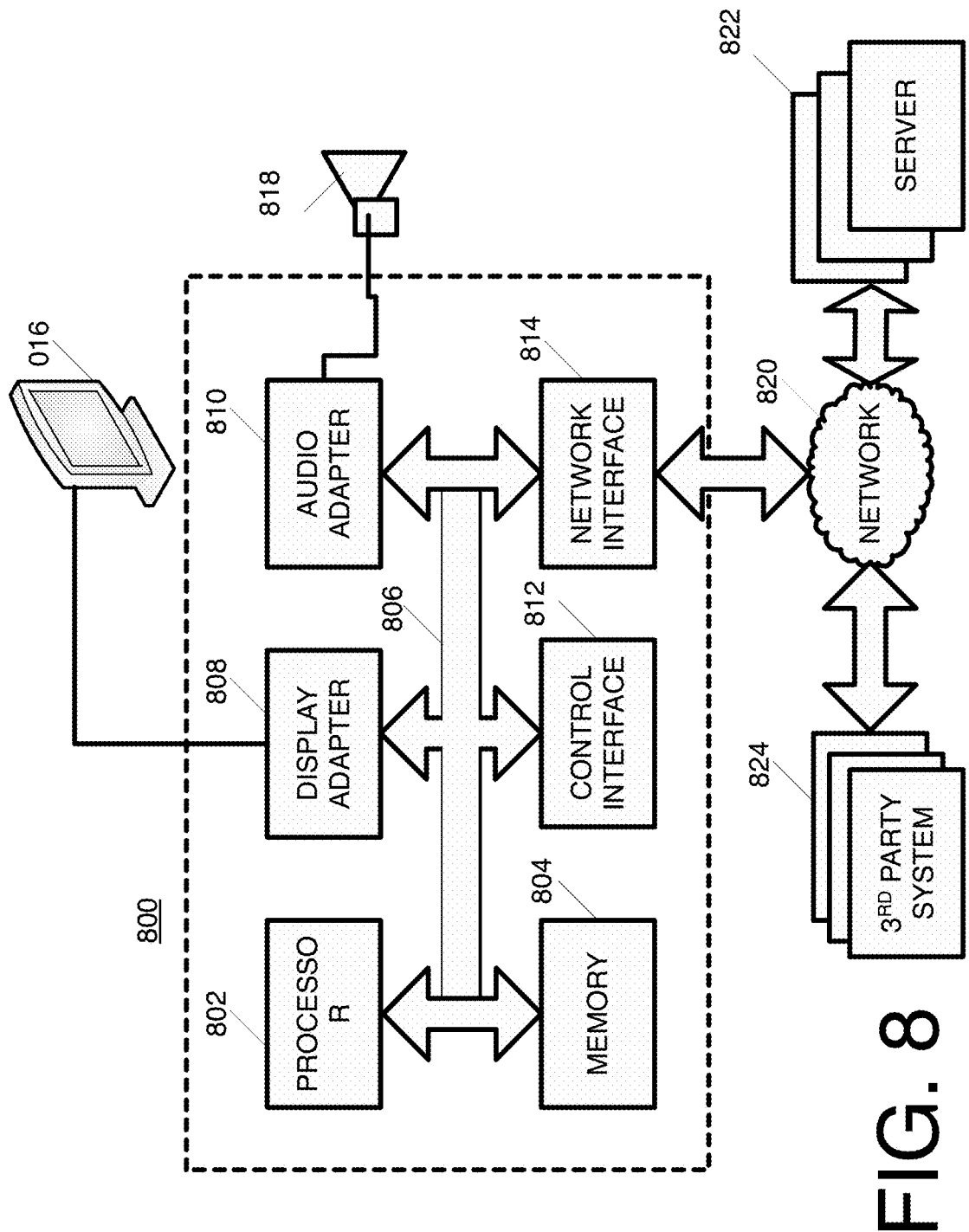
FIG. 8 is a functional block diagram of the components of an exemplary embodiment of a system, device or subsystem that could operate one or more components of the analytics system or devices or systems that the analytics system interfaces to or interacts with during operation.

FIG. 8 is a functional block diagram of the components of an exemplary embodiment of a system, device or subsystem that could operate one or more components of the analytics system or devices or systems that the analytics system interfaces to or interacts with during operation. The system or device 800 could be used in various embodiments of the disclosure for controlling various aspects of the various embodiments. It will be appreciated that not all of the components illustrated in FIG. 8 are required in all embodiments or implementations of a component but, each of the components are presented and described in conjunction with FIG. 8 to provide a complete and overall understanding of the components. Thus, the processing system illustrated in FIG. 8 could be utilized in implementing a mobile device, an MLS app, a VPN server, an MLS platform, as well as other components or devices with which they may interface. The controller can include a general computing platform 800 illustrated as including a processor/memory device 802/804 that may be integrated with each other or, communicatively connected over a bus or similar interface 806. The processor 802 can be a variety of processor types including microprocessors, micro-controllers, programmable arrays, custom IC's etc., and may also include single or multiple processors with or without accelerators or the like. The memory element of 804 may include a variety of structures, including but not limited to RAM, ROM, magnetic media, optical media, bubble memory, FLASH memory, EPROM, EEPROM, etc. The processor 802, or other components in the controller may also provide components such as a real-time clock, analog to digital convertors, digital to analog convertors, etc. The processor 802 is also illustrated as optionally interfacing to a variety of elements including a control interface 812, a display adapter 808, an audio adapter 810, and network/device interface 814. The control interface 812 provides an interface to external controls, such as sensors, actuators, SPDT relays, the PSTN, a cellular network, pressure actuators, step motors, a keyboard, a mouse, a pin pad, an audio activated device, as well as a variety of the many other available input and output devices or, another computer or processing device or the like. The display adapter 808 can be used to drive a variety of alert elements 816, such as display devices including an LED display, LCD display, one or more LEDs or other display devices. The audio adapter 810 may interface to and drive another alert element 818, such as a speaker or speaker system, buzzer, bell, etc. The optional network/interface 814 may interface to a network 820 which may be any type of network including, but not limited to the Internet, a global network, a wide area network, a local area network, a wired network, a wireless network or any other network type including hybrids. Through the network 820, or even directly, the controller 800 can interface to other devices or computing platforms such as one or more servers 822 and/or third party systems 824. A battery or power source provides power for the controller 800.

Figure 9:
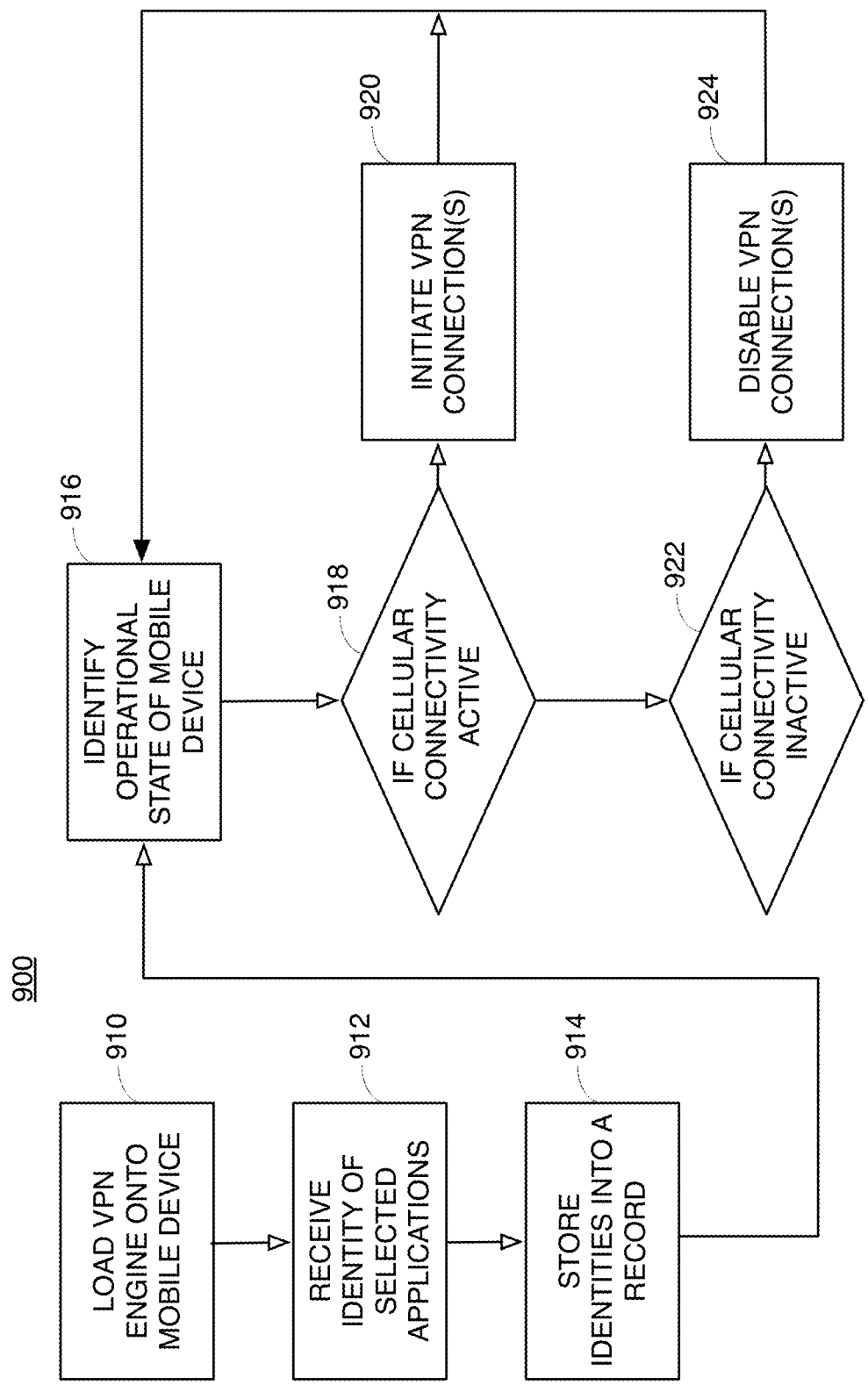
FIG. 9 is a flow diagram illustrating exemplary steps that a VPN starter engine can be perform in various embodiments.

FIG. 9 is a flow diagram illustrating exemplary steps that a VPN starter engine can be perform in various embodiments. Initially the VPN starter engine 900 is loaded onto a mobile device 910. Upon being initialized, the VPN starter engine receives information identifying one or more applications that are loaded on the mobile device and that are to be monitored (selected applications) 912. The VPN engine then stores the identity of the selected applications into a record 914.

The VPN engine then interfaces to the mobile device to identify the operational state of the mobile device 916. If the mobile device is in a state of cellular connectivity 918, then the VPN engine can initiate the establishment of a VPN connection for each of the selected applications 920.

If the VPN engine detects that the mobile device has exited a cellular connectivity state 922, then the VPN engine can disable the VPN connection(s) for the selected applications 924.

The VPN engine can continue to monitor the state of the mobile device 916 and toggle the VPN connections as the state of the mobile device changes. It should be appreciated that in some embodiments, a single VPN connection can be established for all of the selected applications or multiple VPN connections can be established or individual applications or groups of applications at block 920. Likewise, in block 924, each of the VPN connections can be disabled. It should also be appreciated that in some embodiments, the VPN engine may further filter the establishment and disablement of the VPN connections based on the state of the selected applications. For example, if selected application 1 and selected application 2 are active, the VPN engine may establish a VPN connection for these applications when the operational state of the mobile device is cellular connectivity. However, if selected application 3 is not active, the VPN engine may not establish a VPN connection for that particular application. Similarly, if selected application 1 and selected application 2 are to use a single VPN connection, the VPN engine may establish the VPN connection if either selected application 1 or selected application 2 is active.

Figure 10:
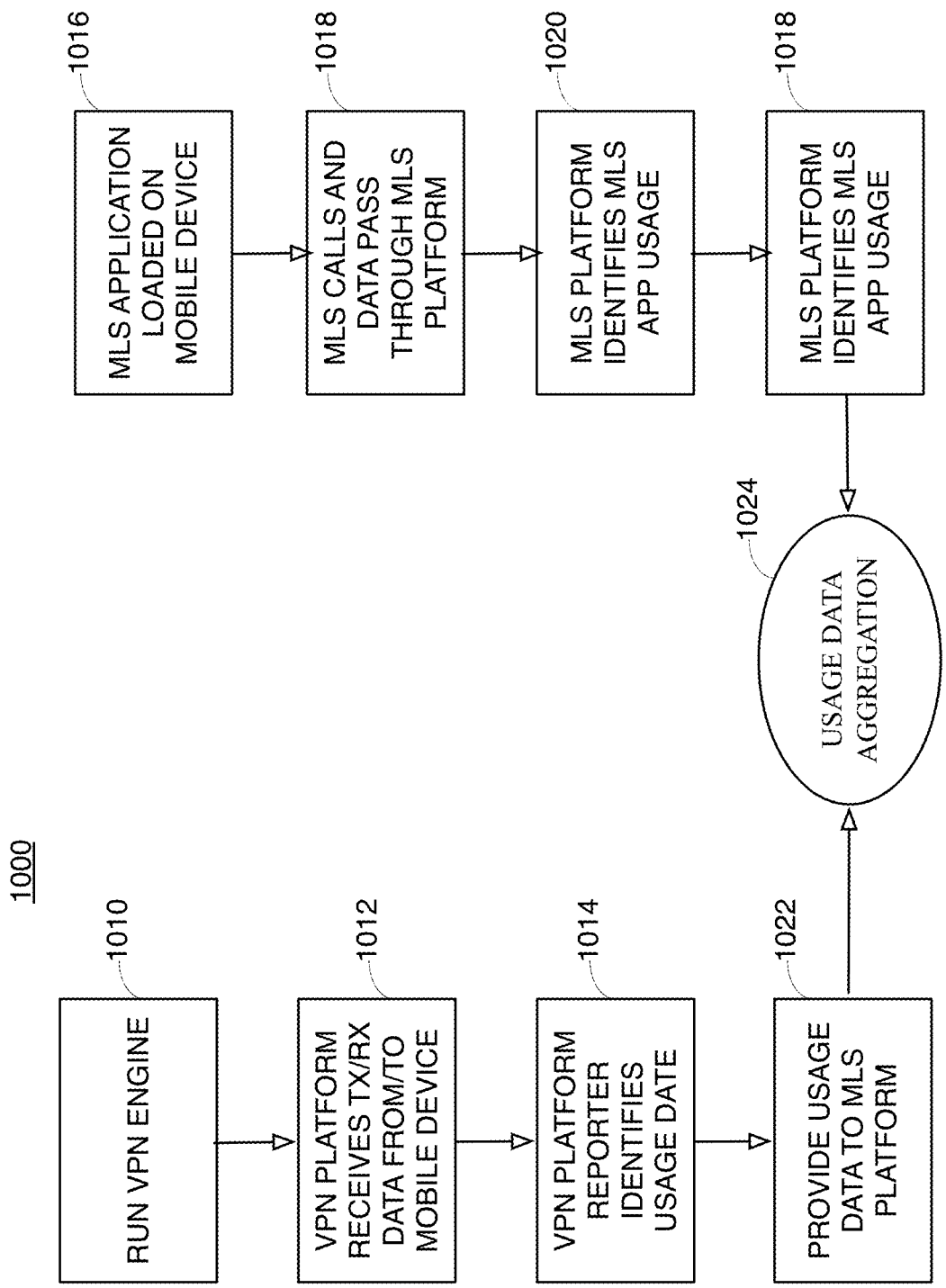
FIG. 10 is a flow diagram illustrating exemplary actions that can be taken by an exemplary embodiment of the analytics system.

FIG. 10 is a flow diagram illustrating exemplary actions that can be taken by an exemplary embodiment of the analytics system. Initially, the analytics system runs a VPN engine a mobile device 1010. The operation of this process may include each of the processes or actions presented in FIG. 9. An entity, such as a VPN platform interfaces to the mobile device and receives the data that is transmitted over the VPN connections between the mobile device and an intended destination 1012. A reporter operating on the VPN platform receives the data and identifies usage information for each of the selected applications and/or all usage date for the selected applications 1014.

In some embodiments, an MLS application may be loaded onto the mobile device 1016. When the MLS application is launched, the call and data transfer information is sent directly through an MLS platform 1018. The MLS platform then identifies the usage information of the MLS app 1020. Further, in such embodiments, the usage information obtained by the VPN platform is provided to the MLS platform 1022. The usage data from the VPN platform and the MLS platform are then combined by the analytics system to generate reports, graphs, provide the information to a billing entity, etc. 1024.

Certain steps or blocks in the processes or process flows described in this specification naturally precede others for the invention to function as described. However, the invention is not limited to the order of the steps or blocks described if such order or sequence does not alter the functionality of the invention. That is, it is recognized that some steps or blocks may be performed before, after, or parallel (substantially simultaneously with) other steps or blocks without departing from the scope and spirit of the invention. In some instances, certain steps or blocks may be omitted or not performed without departing from the invention. Also, in some instances, multiple actions depicted and described as unique steps or blocks in the present disclosure may be comprised within a single step or block. Further, words such as "thereafter", "then", "next", "subsequently", etc. are not intended to limit the order of the steps or blocks. These words are simply used to guide the reader through the description of the exemplary method.

Additionally, one of ordinary skill in programming is able to write computer code or identify appropriate hardware and/or circuits to implement the disclosed invention without difficulty based on the flow charts, block diagrams, screenshots and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows or functionality.

The word "exemplary" is used herein to mean "serving as an example, instance, or illustration." Any aspect described herein as "exemplary" is not necessarily to be construed as preferred or advantageous over other aspects.

In this description, the terms "application" and "app" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "telecommunications device," "communication device," "wireless device," "wireless telephone," "wireless communication device", "mobile device", "BYOD" and "wireless handset" may be used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), or a hand-held computer with a wireless connection or link.

In this description, the terms "call" and "communication," in their noun forms, envision any data transmission routed across a network from one device to another including, but not limited to, a voice transmission, a text message, a video message, a page, etc. In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

In this description, elements may be described as including an interface to another element. These elements may be software, firmware, hardware or a combination of two or more. The term interface is used to describe any interaction between the elements whether the interaction includes a physical transmission of bits or signals, passing variables or data, receiving variables or data, providing control signals, invoking applications, modules, subroutines or the like, pausing applications, transmitting data to the elements, receiving data from the elements or otherwise interacting with the elements. As such, an interface may be a physical connection, a port, or a set of software instructions that result in any of the above-listed actions or interactions. Thus, an interface may simply include an ability to interact with another component residing on the same device, to interact with a separate device and/or to interact with a component residing on a different device.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Although selected aspects have been illustrated and described in detail, it will be understood that various substitutions and alterations may be made therein without departing from the spirit and scope of the present invention, as defined by the following claims.

What is claimed is:

1. A processor executing a virtual private network ("VPN") starter engine and operating in conjunction with a mobile device, the VPN starter engine comprising:
   an interface to a mobile device, wherein the VPN starter engine is configured to determine an operational state of the mobile device, wherein the operational state of the device is one of a state of cellular connectivity or a state of non-cellular connectivity;
   a configuration record, the configuration record identifying a plurality of applications that are loaded on the mobile device to be monitored;
   a VPN connection controller that is configured to initiate a dedicated VPN connection to an entity in response to determining that the operational state of the mobile device is of cellular connectivity, wherein the dedicated VPN connection is associated only with a particular application of the plurality of applications and, to disable the dedicated VPN connection to the entity in response to determining that the operational state of the mobile device is not of cellular connectivity;
   identify data usage of the particular application occurring while the operational state of the mobile device is the state of cellular connectivity and that is transmitted over the dedicated VPN connection to the entity; and
   provide the data usage to a billing entity.

2. The processor executing the VPN starter engine of claim 1, wherein the interface to the mobile device is further configured to identify when the particular application is active and, the VPN connection controller initiates a dedicated VPN connection proximate to a time that the particular application becomes active.

3. The processor executing the VPN starter engine of claim 1, wherein the interface to the mobile device is further configured to identify when the particular application is active and, the VPN connection controller initiates a dedicated VPN connection only when the particular application is active.

4. The processor executing the VPN starter engine of claim 1, wherein the interface to the mobile device is further configured to identify when the particular application is inactive and, the VPN connection controller disables the dedicated VPN connection proximate to a time that the particular application becomes inactive.

5. The processor executing the VPN starter engine of claim 1, wherein the interface to the mobile device is further configured to identify when the particular application is inactive and, the dedicated VPN connection controller disables the VPN connection only when the particular application is inactive.

6. The processor executing the VPN starter engine of claim 1, wherein the VPN starter engine is loaded onto the mobile device and is executed by a processor running on the mobile device.

7. A processor executing a virtual private network ("VPN") starter engine operating in conjunction with a mobile device, the VPN starter engine comprising:
   an interface to a mobile device, wherein the VPN starter engine is configured to determine an operational state of the mobile device;
   a configuration record, the configuration record identifying one or more selected applications that are loaded on the mobile device;
   a VPN connection controller that is configured to initiate a dedicated VPN connection to an entity for each selected application in response to determining that the operational state of the mobile device a state of cellular connectivity, wherein each dedicated VPN connection is associated with a particular selected application and, to disable the dedicated VPN connections to the entity in response to determining that the operational state of the mobile device is not in the state of cellular connectivity;
   whereby any data usage of any particular selected application occurring while the operational state of the mobile device is in the state of mobile connectivity is transmitted over the dedicated VPN connection for that particular selected application to the entity.

8. The processor executing the VPN starter engine of claim 7, wherein the interface to the mobile device is further configured to identify when a particular selected application is active and, the VPN connection controller initiates a dedicated VPN connection for that particular selected application proximate to a time that the particular selected application becomes active.

9. The processor executing the VPN starter engine of claim 7, wherein the interface to the mobile device is further configured to identify when a particular selected application is active and, the VPN connection controller initiates a dedicated VPN connection only for that particular selected application when the particular selected application is active.

10. The processor executing the VPN starter engine of claim 7, wherein the interface to the mobile device is further configured to identify when a particular selected application is inactive and, the VPN connection controller disables the dedicated VPN connection for the particular selected application proximate to a time that the particular selected application becomes inactive.

11. The processor executing the VPN starter engine of claim 7, wherein the interface to the mobile device is further configured to identify when a particular selected application is inactive and, the VPN connection controller disables the dedicated VPN connection for the particular selected application only when the particular application is inactive.

12. The processor executing the VPN starter engine of claim 7, wherein the VPN starter engine is loaded onto the mobile device and is executed by a processor running on the mobile device.

13. A system comprising:
   a virtual private network ("VPN") starter engine operating in conjunction with a mobile device, the VPN starter engine comprising:
      an interface to a mobile device, wherein the VPN starter engine is configured to determine an operational state of the mobile device;
      a configuration record, the configuration record identifying one or more selected applications that are loaded on the mobile device;
      a VPN connection controller that is configured to initiate a dedicated VPN connection to an entity for each selected application of the one or more selected applications in response to determining that the operational state of the mobile device is a state of cellular connectivity, wherein each dedicated VPN connection is associated with a particular selected application of the one or more selected applications and, to disable the dedicated VPN connection to the entity in response to determining that the operational state of the mobile device is not the state of cellular connectivity;

whereby a data usage of a particular selected application of the one or more selected applications occurring while the operational state of the mobile device is the state of mobile connectivity is transmitted over the dedicated VPN connection for the particular selected application of the one or more selected applications to the entity;

the mobile device onto which the VPN starter engine is loaded;

the entity interfacing to the mobile device over the dedicated VPN connection; and a reporter operating on the entity and configured to receive the data usage of each of the selected particular applications of the one or more selected applications running on the mobile device to identify VPN data usage when the selected particular application is active and the operational state of the mobile device in the state of cellular connectivity.

14. The system of claim 13, further comprising a multi-line system (MLS) platform and an MLS application, wherein the MLS application is loaded on the mobile device and a data usage by the MLS application runs through the MLS platform.

15. The system of claim 14, wherein the MLS platform further interfaces to the entity to receive usage data associated with the particular selected applications of the one or more selected applications of the mobile device and the MLS platform is configured to aggregate the usage data of the MLS application and the usage data associated with the particular selected applications of the one or more selected applications to create a usage report identifying all usage of the MLS application and the particular selected applications of the one or more selected applications.

16. A method for collecting usage data of one or more selected applications loaded on a mobile device, the method comprising the actions of:

loading a virtual private network ("VPN") engine onto a mobile device;

receiving an identity of the one or more selected applications that are loaded onto the mobile device;

storing the identity of the one or more selected applications into a record;

identifying an operational state of the mobile device;

initiating dedicated VPN connections for each of the one or more selected applications if the operational state of the mobile device is cellular connectivity; and the VPN starter engine disabling the dedicated VPN connections for the one or more selected applications if the operational state of the mobile device is not cellular connectivity.

17. The method of claim 16, further comprising receiving data transmitted over the dedicated VPN connections and generating usage information for the one or more selected applications.

18. The method of claim 17, further comprising the actions of:

loading a multi-line (MLS) application onto the mobile device;

identifying usage information for the MLS application;

receiving the usage information from the dedicated VPN connections; and combining the usage information for the MLS application and from the dedicated VPN connections.

* * * * *